US008897246B2

(12) United States Patent
Nakao

(10) Patent No.: US 8,897,246 B2
(45) Date of Patent: Nov. 25, 2014

(54) TERMINAL APPARATUS AND RESPONSE SIGNAL TRANSMITTING METHOD

(75) Inventor: Seigo Nakao, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 196 days.

(21) Appl. No.: 13/696,664

(22) PCT Filed: May 6, 2011

(86) PCT No.: PCT/JP2011/002552
§ 371 (c)(1),
(2), (4) Date: Nov. 7, 2012

(87) PCT Pub. No.: WO2011/145284
PCT Pub. Date: Nov. 24, 2011

(65) Prior Publication Data
US 2013/0064210 A1   Mar. 14, 2013

(30) Foreign Application Priority Data

May 19, 2010   (JP) ................................ 2010-115468

(51) Int. Cl.
*H04J 1/16* (2006.01)
*H04L 1/18* (2006.01)
*H04L 5/00* (2006.01)
*H04J 11/00* (2006.01)
*H04J 13/00* (2011.01)

(52) U.S. Cl.
CPC ........... *H04J 11/0079* (2013.01); *H04L 1/1861* (2013.01); *H04J 13/0048* (2013.01); *H04L 5/001* (2013.01); *H04J 13/0055* (2013.01); *H04L 5/0094* (2013.01)
USPC ........... 370/329; 370/315; 370/312; 455/509; 455/450; 455/515

(58) Field of Classification Search
None
See application file for complete search history.

(56) References Cited

U.S. PATENT DOCUMENTS

| 2010/0135237 | A1* | 6/2010 | Papasakellariou et al. | ... 370/329 |
| 2010/0172428 | A1* | 7/2010 | Pani et al. | ...................... 375/262 |
| 2010/0271970 | A1* | 10/2010 | Pan et al. | ......................... 370/252 |
| 2010/0272048 | A1* | 10/2010 | Pan et al. | ......................... 370/329 |
| 2011/0026476 | A1* | 2/2011 | Lee et al. | ...................... 370/329 |

(Continued)

OTHER PUBLICATIONS

3GPP TS 36.211 V8.7.0, "Physical Channels and Modulation (Release 8)," May 2009.
3GPP TS 36.212 V8.7.0, "Multiplexing and channel coding (Release 8)," May 2009.

(Continued)

*Primary Examiner* — Ian N Moore
*Assistant Examiner* — Dung B Huynh
(74) *Attorney, Agent, or Firm* — Pearne & Gordon LLP

(57) ABSTRACT

This invention is related to a terminal apparatus that can normally transmit an upstream response signal. A response signal generating unit (212); generates response signals on the basis of a setting rule in which pattern candidates of success or failure in the reception of downstream allocation control information and downstream data are associated with the phase points of response signals and further in which the phase point of one response signal associated with an arbitrary pattern of success or failure in the reception during the second communication has been set to be identical with the phase points of two response signals associated with pattern candidates for which the pattern of success or failure in the reception at PCC during the first communication is identical with the arbitrary pattern and for which all of the receptions of downstream allocation control information have been failed at SCC.

3 Claims, 11 Drawing Sheets

(56) References Cited

U.S. PATENT DOCUMENTS

| | | | |
|---|---|---|---|
| 2011/0205978 A1* | 8/2011 | Nory et al. | 370/329 |
| 2011/0216686 A1* | 9/2011 | Wu | 370/312 |
| 2011/0239076 A1* | 9/2011 | Liu et al. | 714/751 |
| 2011/0268059 A1* | 11/2011 | Li et al. | 370/329 |
| 2011/0275374 A1* | 11/2011 | Narasimha et al. | 455/436 |
| 2012/0057490 A1* | 3/2012 | Park et al. | 370/252 |
| 2012/0063302 A1* | 3/2012 | Damnjanovic et al. | 370/228 |
| 2012/0099542 A1* | 4/2012 | Yuk et al. | 370/329 |
| 2012/0113939 A1* | 5/2012 | Kim et al. | 370/329 |
| 2012/0320818 A1* | 12/2012 | Yang et al. | 370/315 |
| 2013/0010743 A1* | 1/2013 | Ahn et al. | 370/329 |
| 2013/0010964 A1* | 1/2013 | Fong et al. | 380/277 |
| 2013/0142133 A1* | 6/2013 | Pedersen et al. | 370/329 |
| 2013/0329692 A1* | 12/2013 | Vrzic et al. | 370/329 |

OTHER PUBLICATIONS

3GPP TS 36.213 V8.7.0, "Physical layer procedures (Release 8)," May 2009.

Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, Apr. 2009.

Panasonic, "Support of UL ACK/NACK channel selection for carrier aggregation", 3GPP TSG RAN WG1 Meeting #59bis, R1-100364, Jan. 18-20, 2010, p. 1-4.

Ericsson, "A/N transmission in the uplink for carrier aggregation", 3GPP TSG-RAN WG1 #60, R1-100909, Feb. 22-26, 2010, p. 1-4.

International Search Report for Application No. PCT/JP2011/002552 dated Jun. 7, 2011.

* cited by examiner

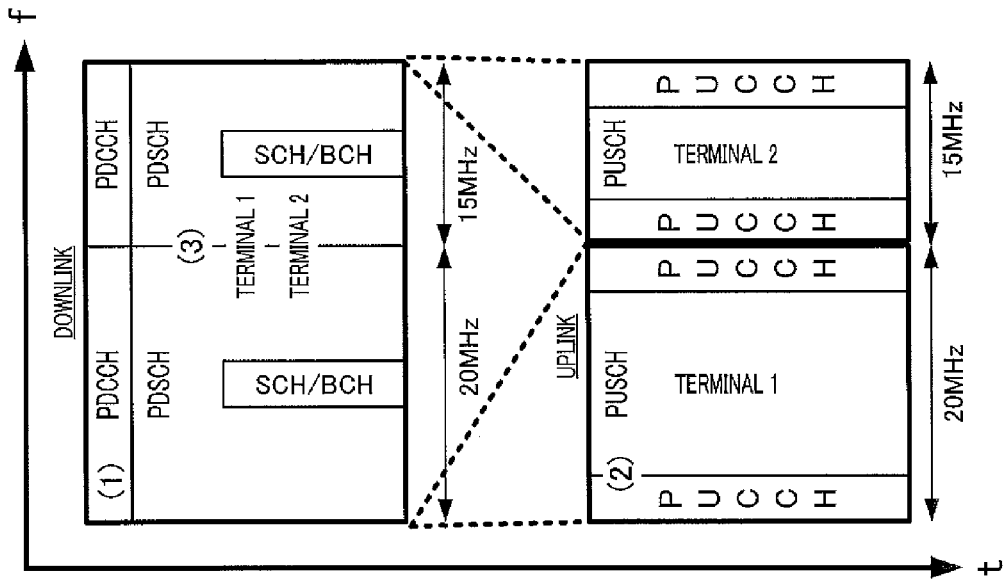
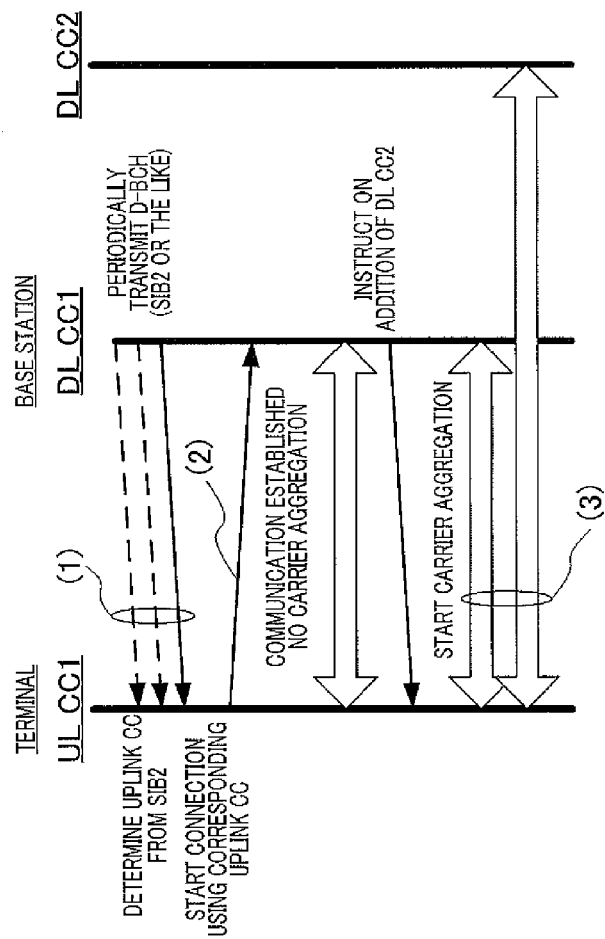
FIG.2A
FIG.2B

TERMINAL APPARATUS AND RESPONSE SIGNAL TRANSMITTING METHOD

TECHNICAL FIELD

The present invention relates to a terminal apparatus and a response signal transmission method.

BACKGROUND ART

3GPP LTE adopts OFDMA (Orthogonal Frequency Division Multiple Access) as a downlink communication scheme. In a radio communication system to which 3GPP LTE is applied, a base station apparatus (hereinafter, abbreviated as "base station") transmits a synchronization signal (i.e., Synchronization Channel: SCH) and broadcast signal (i.e., Broadcast Channel: BCH) using predetermined communication resources. A terminal apparatus (hereinafter abbreviated as "terminal") locates an SCH to secure synchronization with the base station first. After that, the terminal reads BCH information to acquire base station-specific parameters (e.g., frequency bandwidth) (see Non-Patent Literatures 1, 2, and 3).

Upon completion of the acquisition of the base station-specific parameters, the terminal sends a connection request to the base station to thereby establish communication with the base station. The base station transmits control information to the terminal with which communication has been established via a PDCCH (Physical Downlink Control CHannel) as required.

The terminal then makes a "blind decision" on a plurality of control information portions included in the received PDCCH signal. That is, each of the control information portions includes a CRC (Cyclic Redundancy Check) portion and the base station masks this CRC portion with a terminal ID of the transmission target terminal. Therefore, the terminal cannot make a decision on whether the received control information portion is addressed to the terminal or not until the terminal demasks the CRC portion of the received control information portion with the terminal ID of the terminal. In the blind decision, if the demasking result shows that the CRC operation is OK, the control information portion is judged as being addressed to the terminal apparatus.

Furthermore, in 3GPP LTE, ARQ (Automatic Repeat Request) is applied to downlink data from the base station to the terminal. That is, the terminal feeds back a response signal indicative of an error detection result of the downlink data to the base station. The terminal performs a CRC on the downlink data and feeds back ACK (Acknowledgment) when CRC=OK (no error) or NACK (Negative Acknowledgment) when CRC=NO (error) to the base station as a response signal. Here, BPSK (Binary Phase Shift Keying) is used to modulate the response signal (that is, ACK/NACK signal). Furthermore, an uplink control channel such as PUCCH (Physical Uplink Control Channel) is used to feed back the response signal. When the received response signal indicates NACK, the base station transmits retransmission data to the terminal.

Here, the control information transmitted from the base station (that is, downlink allocation control information) contains resource allocation information including resource information or the like allocated to the terminal by the base station. The above-described PDCCH is used to transmit the control information. The PDCCH is formed of one or a plurality of L1/L2 CCHs (L1/L2 Control Channels). Each L1/L2 CCH is formed of one or a plurality of CCEs (Control Channel Elements). That is, the CCE is a base unit when control information is mapped to the PDCCH. Furthermore, when one L1/L2 CCH is formed of a plurality of CCEs, the plurality of CCEs having serial identification numbers (indices) are assigned to the L1/L2 CCH. The base station allocates the L1/L2 CCH to a resource allocation target terminal according to the number of CCEs necessary to notify the resource allocation target terminal of control information. The base station then transmits control information mapped to physical resources corresponding to CCEs of the L1/L2 CCH.

Here, CCEs are associated with component resources of the PUCCH in a one-to-one correspondence. Therefore, the terminal that has received the L1/L2 CCH can implicitly identify the component resources of the PUCCH corresponding to the CCEs constituting the L1/L2 CCH and transmits a response signal to the base station using the identified resources. However, when the L1/L2 CCH occupies a plurality of consecutive CCEs, the terminal transmits a response signal to the base station using one of the plurality of PUCCH component resources corresponding to the plurality of CCEs (e.g., PUCCH component resource corresponding to a CCE having the smallest index). Downlink communication resources are thereby used efficiently.

A plurality of response signals and reference signals transmitted from a plurality of terminals are spread on a time axis (i.e., time domain) using a ZAC (Zero Auto-correlation) sequence (may also be called "base sequence") having a Zero Auto-correlation characteristic and Walsh code sequence or DFT (Discrete Fourier Transform) sequence as shown in FIG. 1, and code-multiplexed within a PUCCH (however, a ZAC sequence having a sequence length of 12 itself may also be called "reference sequence").

In FIG. 1, $(W_0, W_1, W_2, W_3)$ represents a Walsh sequence (Walsh code sequence) having a sequence length of 4 and $(F_0, F_1, F_2)$ represents a DFT sequence having a sequence length of 3. As shown in FIG. 1, in the terminal, an ACK or NACK response signal is primary-spread within 1 SC-FDMA symbol on the frequency axis by a ZAC sequence (having a sequence length of 12, may also be referred to as "Base Sequence") first. Next, the primary-spread response signals are associated with $W_0$ to $W_3$ respectively and subjected to IFFT (Inverse Fast Fourier Transform). Furthermore, in the terminal, a ZAC sequence having a sequence length of 12 and serving as a reference signal is associated with $F_0$ to $F_2$ respectively and subjected to IFFT. Thus, the response signal and reference signal spread using the ZAC sequence having a sequence length of 12 on the frequency axis (Frequency domain) and the reference signal are converted to a ZAC sequence having a sequence length of 12 on the time axis through IFFT. This is equivalent to a primary-spread response signal and the reference signal after IFFT further being secondary-spread using a Walsh sequence (sequence length of 4) and a DFT sequence (sequence length of 3).

Response signals from different terminals are spread using ZAC sequences corresponding to different amounts of cyclic shift (cyclic shift indices) or orthogonal code sequences corresponding to different sequence numbers (orthogonal cover indices: OC indices). An orthogonal code sequence is a combination of a Walsh sequence and a DFT sequence. Furthermore, the orthogonal code sequence may also be referred to as "block-wise spreading code sequence." Therefore, the base station can demultiplex a plurality of code-multiplexed response signals, using conventional despreading and correlation processing (see Non-Patent Literature 4).

However, since each terminal makes a blind decision on downlink allocation control information addressed to the terminal apparatus in each subframe (transmission unit time), reception of downlink allocation control information is not always successful on the terminal side. When the terminal fails to receive downlink allocation control information addressed to the terminal in a certain downlink component carrier, the terminal cannot even know whether or not downlink data addressed to the terminal exists in the downlink component carrier. Therefore, when the terminal fails to receive downlink allocation control information in a certain downlink component carrier, the terminal does not generate any response signal for downlink data in the downlink component carrier either. This erroneous case is defined as DTX (Discontinuous transmission of ACK/NACK signals) of response signals in the sense that the terminal does not transmit any response signal.

Furthermore, standardization of 3GPP LTE-advanced for realizing faster communication speed than 3GPP LTE has started. 3GPP LTE-advanced systems (hereinafter may also be referred to as "LTE-A systems") follow 3GPP LTE systems (hereinafter may also be referred to as "LTE systems"). 3GPP LTE-advanced is expected to introduce base stations and terminals communicable at a wideband frequency of 40 MHz or more to realize a downlink transmission rate of a maximum of 1 Gbps or above.

To simultaneously realize an ultra-high-speed communication several times faster than transmission rates in LTE systems and backward compatibility with LTE systems, in LTE-A systems, LTE-A system bands are divided into "component carriers" of 20 MHz or below which is the support bandwidth of LTE systems. That is, the "component carrier" is a band having a width of a maximum of 20 MH and is defined as a base unit of communication band. Furthermore, a "component carrier" in a downlink (hereinafter referred to as "downlink component carrier") may be defined as a band divided by downlink frequency band information in a BCH broadcast from the base station or a band defined by a distribution width in the case where a downlink control channel (PDCCH) is distributed in a frequency domain. Furthermore, a "component carrier" in an uplink (hereinafter referred to as "uplink component carrier") may also be defined as a band divided by uplink frequency band information in a BCH broadcast from the base station or a base unit for a communication band of 20 MHz or below including a PUSCH (Physical Uplink Shared CHannel) region near its center and PUCCHs for LTE at both ends. Furthermore, the "component carrier" in 3GPP LTE-Advanced may be expressed in English as Component Carrier(s), and may also be defined by a physical cell number and carrier frequency number, and may be called "cell."

The LTE-A system supports communication using a band that bundles several component carriers, so-called "carrier aggregation." Throughput requirements for an uplink are generally different from throughput requirements for a downlink. In the LTE-A system, carrier aggregation in which the number of component carriers set for any terminal supporting an LTE-A system (hereinafter referred to as "LTE-A terminal") is different between the uplink and the downlink, so-called "asymmetric carrier aggregation" is also being discussed. Furthermore, the LTE-A system also supports configurations where the numbers of component carriers are asymmetric between the uplink and downlink, and the component carriers have different frequency bandwidths.

FIG. 2 is a diagram illustrating asymmetric carrier aggregation and a control sequence applied to individual terminals. FIG. 2 shows an example where bandwidths and the numbers of component carriers are symmetric between an uplink and a downlink of a base station.

In FIG. 2B, a setting (hereinafter, referred to as a configuration) is made for terminal 1 such that carrier aggregation is performed using two downlink component carriers and one uplink component carrier on the left side, whereas a configuration is made for terminal 2 such that although the two same downlink component carriers as those in terminal 1 are used, one uplink component carrier on the right side is used for uplink communication.

Referring to terminal 1, an LTE-A base station and an LTE-A terminal included in an LTE-A system transmit and receive signals to and from each other according to a sequence diagram illustrated in FIG. 2A. As illustrated in FIG. 2A, (1) terminal 1 is synchronized with the downlink component carrier on the left side when starting communication with the base station, and reads information on the uplink component carrier from a broadcast signal called "SIB2 (system information block type 2)," the uplink component carrier forming a pair with the downlink component carrier on the left side. (2) Using this uplink component carrier, terminal 1 starts communication with the base station by transmitting, for example, a connection request to the base station. (3) Upon determining that a plurality of downlink component carriers need to be assigned to the terminal, the base station instructs the terminal to add the downlink component carriers. However, in this case, the number of uplink component carriers does not increase, and terminal 1 which is an individual terminal starts asymmetric carrier aggregation.

Furthermore, in the above LTE-A system to which carrier aggregation is applied, the terminal may receive a plurality of downlink data portions in a plurality of downlink component carriers at a time. In LTE-A systems, studies are being carried out on a technique of reducing a spreading factor of response signals in a PUCCH (so-called SF (Spreading Factor) reduction) as one of a plurality of response signal transmission methods for the plurality of downlink data portions.

To be more specific, as shown in FIG. 3, two response signals (Symbol 1 and Symbol 2) are generated on the terminal side, the two response signals are spread by Walsh code sequences ($W_{0,0}$, $W_{0,1}$) and ($W_{1,0}$, $W_{1,1}$) having a sequence length of 2 respectively and arranged on first and second SC-FDMA symbols, and sixth and seventh SC-FDMA symbols respectively. By so doing, even when the terminal receives a plurality of downlink data portions in a plurality of downlink component carriers at a time, the terminal can feed back a plurality of response signals for the plurality of downlink data portions to the base station at a time.

CITATION LIST

Non-Patent Literature

NPL 1
3GPP TS 36.211 V8.7.0, "Physical Channels and Modulation (Release 8)," May 2009
NPL 2
3GPP TS 36.212 V8.7.0, "Multiplexing and channel coding (Release 8)," May 2009
NPL 3
3GPP TS 36.213 V8.7.0, "Physical layer procedures (Release 8)," May 2009
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009

SUMMARY OF INVENTION

Technical Problem

A base station changes (adds or deletes) the number of component carriers configured in a terminal, using higher layer signaling (e.g., RRC signaling). FIG. 4 is a diagram illustrating a signaling sequence when the base station changes the number of component carriers of the terminal.

FIG. 4 illustrates an example of a case where, while the terminal (UE) is communicating without carrier aggregation (the number of downlink component carriers: 1), the base station (eNB) configures carrier aggregation (the number of downlink component carriers: 2) in the terminal using RRC signaling. As shown in FIG. 4, an RRC (Radio Resource Controller) on the base station side generates a message "CC reconfiguration message" for configuring the number of downlink component carriers in the terminal to be two (Downlink Component carrier (DL CC)=2) first. The downlink data (DL data) including the "CC reconfiguration message" generated on the base station is transferred, by being carried on a downlink data resource (layer 1 (L1)) to the terminal.

Upon receipt of the "CC reconfiguration message," the RRC on the terminal side recognizes that carrier aggregation is configured in the terminal (i.e., the number of downlink component carriers (DL CC) is changed from 1 to 2) and starts an operation of receiving data from the base station in two downlink component carriers (that is, communication using carrier aggregation). Furthermore, the RRC on the terminal side generates a "CC reconfiguration complete message" which is a response message corresponding to the "CC reconfiguration message" received from the base station. This "CC reconfiguration complete message" is returned to the base station by being carried on an uplink data resource separately assigned from the base station. For example, as shown in FIG. 4, the terminal transmits an SRI (Scheduling Request Indicator) to indicate the generation of uplink data (response message) to be transmitted from the terminal side. Upon receipt of the SRI, the base station reports allocation of the uplink data resource (UL grant) to the terminal using a PDCCH. Upon receipt of the "CC reconfiguration complete message" from the terminal, the base station recognizes that the configuration (change of the number of downlink component carriers (DL CC) of carrier aggregation on the terminal side) is completed and starts an operation of transmitting data in two downlink component carriers (that is, communication using carrier aggregation).

As shown in FIG. 4, upon receipt of the "CC reconfiguration message" from the base station, the terminal side starts communication based on the reconfigured (changed) number of downlink component carriers. In contrast, upon receipt of the "CC reconfiguration complete message" from the terminal, the base station side starts communication based on the reconfigured (changed) number of downlink component carriers. That is, when the base station changes the number of downlink component carriers for the terminal, there is a period during which a difference occurs in recognition between the base station and the terminal regarding the configuration of the number of downlink component carriers configured in the terminal. As shown in FIG. 4, not only when the base station (eNB) changes the configuration from "no carrier aggregation" to "with carrier aggregation," but also when the base station changes the configuration from "with carrier aggregation" to "no carrier aggregation" using RRC signaling, there is a period during which a "difference occurs in recognition regarding the configuration of the number of downlink component carriers."

Furthermore, when the "CC reconfiguration complete message" transmitted from the terminal does not promptly arrive at the base station, the aforementioned period during which a "difference occurs in recognition regarding the configuration of the number of downlink component carriers" becomes longer. For example, when a state in which uplink data resources cannot be allocated to the terminal due to the scheduling on the base station side lasts long or when the propagation path situation of the uplink is poor and thus retransmission of the uplink data frequently occurs, the delay in transmission of the "CC reconfiguration complete message" increases. In this case, the "difference in recognition between the base station and the terminal regarding the configuration of the number of downlink component carriers" lasts for a long period of time.

Such a difference in recognition between the base station and the terminal regarding the configuration of the number of downlink component carriers poses a big problem when switching between techniques of transmitting response signals for downlink data in accordance with the number of downlink component carriers configured in the terminal. For example, suppose a case where the terminal switches between the aforementioned response signal transmission technique with no carrier aggregation (FIG. 1) and the aforementioned response signal transmission technique with the SF Reduction (FIG. 3). For a period during which a difference occurs in recognition between the base station and the terminal regarding the configuration of the number of downlink component carriers configured in the terminal, there may be a situation where the terminal side transmits a response signal using the response signal transmission technique shown in FIG. 3 (or FIG. 1) despite the fact that the base station side is waiting for a response signal transmitted using the response signal transmission technique shown in FIG. 1 (or FIG. 3). For this reason, there is a problem that the base station side cannot normally receive uplink response signals for a period during which a difference occurs in recognition between the base station and the terminal regarding the configuration of the number of downlink component carriers set in the terminal.

It is an object of the present invention to provide a terminal apparatus and a response signal transmission method capable of normally transmitting an uplink response signal from the terminal to a base station when the base station changes the configuration of carrier aggregation for the terminal, using higher layer signaling even during a period while a difference occurs in recognition between the base station and the terminal regarding the configuration of the number of downlink component carriers configured in the terminal.

Solution to Problem

A terminal apparatus according to a first aspect of the present invention adopts a configuration, including: a receiving section that receives allocation control information transmitted through a control channel of at least one of a plurality of component carriers, and data transmitted through a data channel in first communication with a base station apparatus using the plurality of component carriers including a primary component carrier, or second communication with the base station apparatus using only the primary component carrier; a generating section that generates, in the second communication, one response signal indicating success/failure in receiving the data through the primary component carrier, and generates, in the first communication, two response signals indicating success/failure in receiving the allocation control information and the data of the plurality of component carriers; and a sequence multiplication section that multiplies, in the second communication, the one response signal by a first sequence and multiplies, in the first communication, the two response signals by a second sequence and a third sequence, respectively, the second and third sequences being obtained by dividing the first sequence, in which: success/failure in receiving the allocation control information and the data is indicated by phase points of the response signals, and a phase point of the one response signal indicating the success/failure in reception for the primary component carrier in the second communication is identical to respective phase points of the two response signals indicating the success/failure in reception for the primary component carrier identical to the success/failure in reception for the primary component carrier in the second communication and the success/failure in reception which is a state in which the allocation control information is not received through component carriers other than the primary component carrier.

A response signal transmission method according to a second aspect of the present invention including: receiving allocation control information transmitted through a control channel of at least one of a plurality of component carriers and data transmitted through a data channel in first communication with a base station apparatus using the plurality of component carriers including a primary component carrier, or second communication with the base station apparatus using only the primary component carrier; generating, in the second communication, one response signal indicating success/failure in receiving the data of the primary component carrier, and generating, in the first communication, two response signals indicating success/failure in receiving the allocation control information and the data of the plurality of component carriers; multiplying, in the second communication, the one response signal by a first sequence, and multiplying, in the first communication, the two response signals by a second sequence and a third sequence, respectively, the second sequence and third sequence being obtained by dividing the first sequence, in which: success/failure in receiving the allocation control information and the data is indicated by phase points of the response signals, and a phase point of the one response signal indicating the success/failure in reception for the primary component carrier in the second communication is identical to respective phase points of the two response signals indicating the success/failure in reception for the primary component carrier identical to the success/failure in reception for the primary component carrier in the second communication and the success/failure in reception which corresponds to a state in which the allocation control information is not received through component carriers other than the primary component carrier.

Advantageous Effects of Invention

According to the present invention, when the base station changes the configuration of carrier aggregation for the terminal using higher layer signaling, it is possible to normally transmit an uplink response signal from the terminal to the base station even for a period during which a difference occurs in recognition regarding the configuration of the number of downlink component carriers configured in the terminal between the base station and the terminal.

BRIEF DESCRIPTION OF DRAWINGS

FIG. 2 is a diagram illustrating asymmetric carrier aggregation applied to individual terminals and a control sequence thereof;

DESCRIPTION OF EMBODIMENTS

Figure 1:
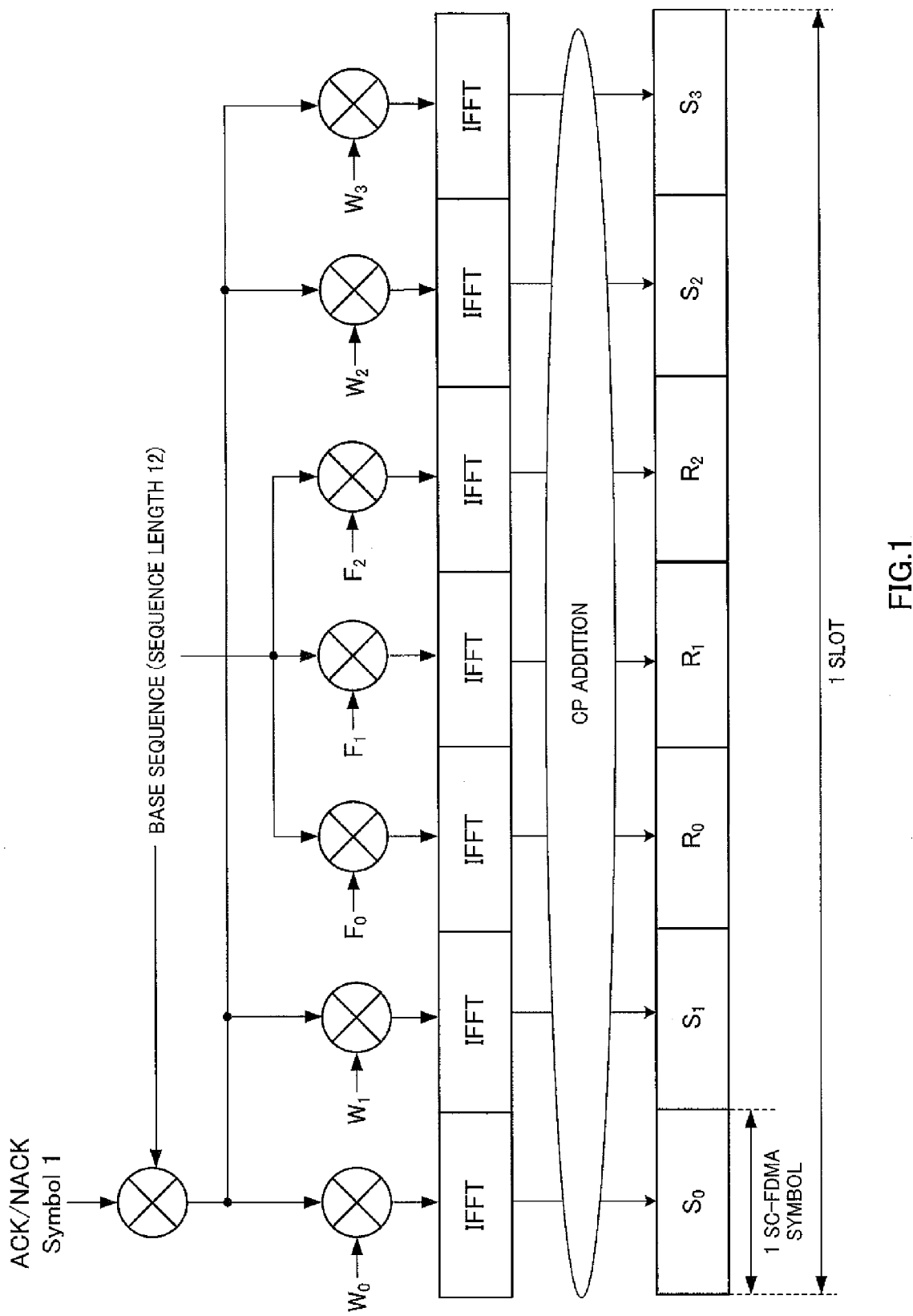
FIG. 1 is a diagram illustrating a method of spreading a response signal and a reference signal.

Hereinafter, an embodiment of the present invention will be described in detail with reference to the accompanying drawings. Identical components in the embodiment will be assigned identical reference numerals and overlapping descriptions thereof will be omitted.

[Overview of Communication System]

A communication system including a base station 100 (FIG. 5) and terminal 200 (FIG. 6) which will be described later performs communication using an uplink component carrier and a plurality of downlink component carriers associated with the uplink component carrier, that is, communication using asymmetric carrier aggregation specific to terminal 200. Furthermore, this communication system also includes terminals that have no capability of performing communication using carrier aggregation unlike terminal 200, and perform communication using one downlink component carrier and one uplink component carrier associated therewith (that is, communication without carrier aggregation). Therefore, base station 100 is configured so as to be able to support both communication using asymmetric carrier aggregation and communication without carrier aggregation.

Furthermore, communication without carrier aggregation may also be performed between base station 100 and terminal 200, depending on resource allocation to terminal 200 by base station 100.

For communication without carrier aggregation, this communication system performs conventional ARQ, whereas the communication system adopts SF reduction in ARQ for communication with carrier aggregation. That is, this communication system is an LTE-A system, while base station 100 is an LTE-A base station and terminal 200 is an LTE-A terminal, for example. Furthermore, a terminal not capable of performing communication using carrier aggregation is, for example, an LTE terminal.

A description will be given based on the following assumption. That is, between base station 100 and terminal 200, asymmetric carrier aggregation specific to terminal 200 is configured beforehand and information on downlink component carriers and uplink component carriers to be used in terminal 200 is shared between base station 100 and terminal 200. Furthermore, base station 100 determines one of the plurality of downlink component carriers configured in terminal 200 as a basic component carrier (Primary Component Carrier: PCC) and information on this primary component carrier is also shared between base station 100 and terminal 200.

Figure 4:
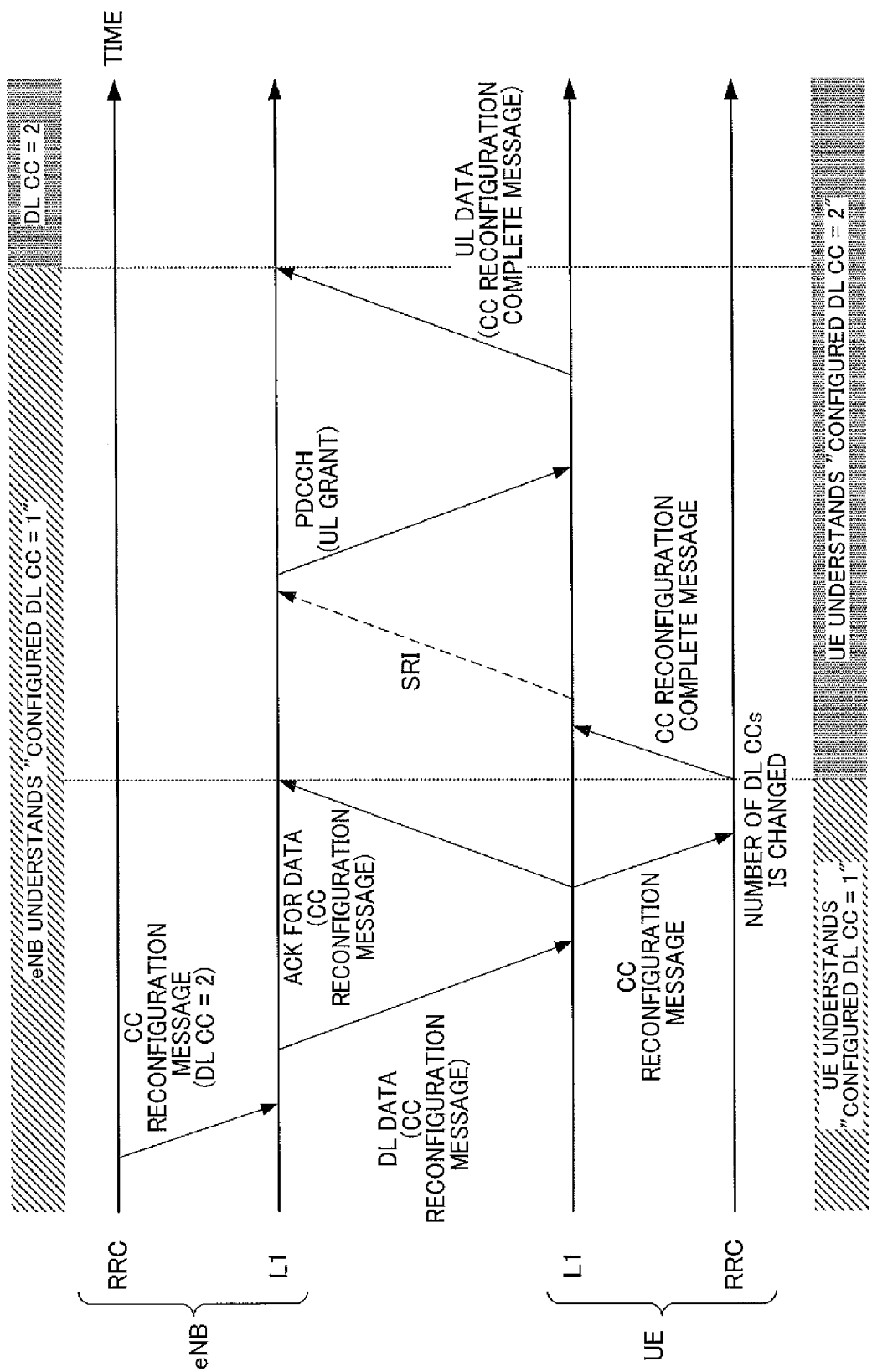
FIG. 4 is a sequence diagram of signaling when a base station changes component carriers for a terminal.

However, base station 100 does not always transmit signals to terminal 200 using all of the plurality of downlink component carriers. When transmitting signals to terminal 200 using only one downlink component carrier, base station 100 uses the aforementioned primary component carrier in priority to the others. Here, as described above (FIG. 4), base station 100 changes the configuration of carrier aggregation for terminal 200 using higher layer signaling. That is, terminal 200 is a terminal that can switch between communication with base station 100 using a plurality of downlink component carriers including the primary component carrier (communication using carrier aggregation) and communication with base station 100 using only one downlink component carrier (primary component carrier) (communication without carrier aggregation).

[Configuration of Base Station]

Figure 5:
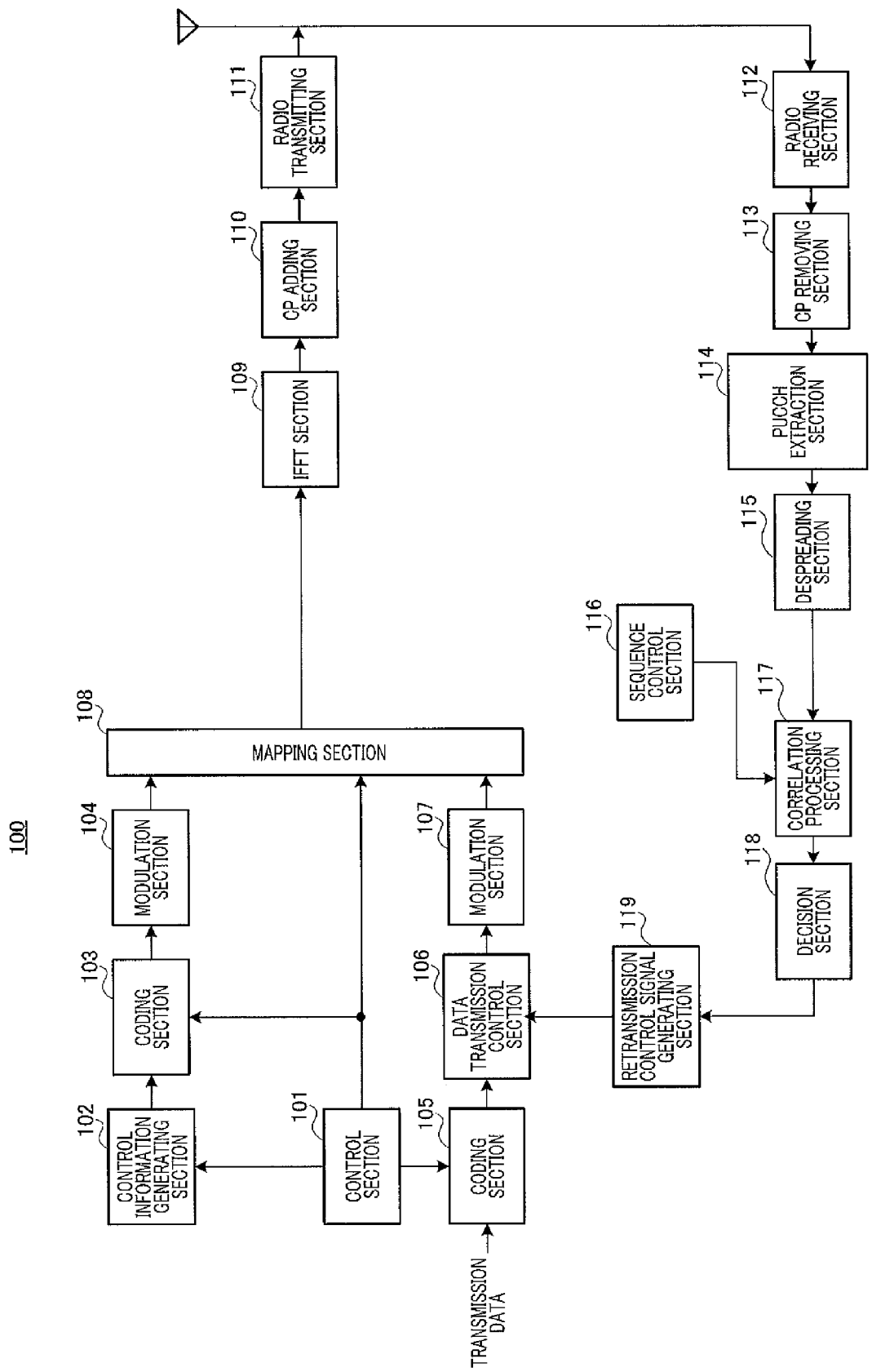
FIG. 5 is a block diagram showing a configuration of a base station according to an embodiment of the present invention.

FIG. 5 is a block diagram illustrating a configuration of base station 100 according to an embodiment of the present invention. In FIG. 5, base station 100 includes control section 101, control information generating section 102, coding section 103, modulation section 104, coding section 105, data transmission control section 106, modulation section 107, mapping section 108, IFFT section 109, CP adding section 110, radio transmitting section 111, radio receiving section 112, CP removing section 113, PUCCH extraction section 114, despreading section 115, sequence control section 116, correlation processing section 117, decision section 118, and retransmission control signal generating section 119.

Control section 101 assigns, to resource allocation target terminal 200, downlink resources to transmit control information (that is, downlink control information allocation resources) and downlink resources to transmit downlink data contained in the control information (that is, downlink data allocation resources). Such resource allocation is performed in downlink component carriers included in a component carrier group configured in resource allocation target terminal 200. Furthermore, downlink control information allocation resources are selected from among resources corresponding to a downlink control channel (PDCCH) in each downlink component carrier. Furthermore, downlink data allocation resources are selected from among resources corresponding to a downlink data channel (PDSCH) in each downlink component carrier. Furthermore, when there are a plurality of resource allocation target terminals 200, control section 101 assigns different resources to those resource allocation target terminals 200 respectively.

A downlink control information allocation resource is equivalent to that of the above L1/L2 CCH. That is, the downlink control information allocation resource is formed of one or a plurality of CCEs. Furthermore, CCEs in a primary component carrier are associated with component resources of an uplink control channel region (PUCCH region) in an uplink component carrier in a component carrier group in a one-to-one correspondence.

Furthermore, control section 101 determines a coding rate used to transmit control information to resource allocation target terminal 200. Since the amount of data of control information differs depending on this coding rate, control section 101 assigns downlink control information allocation resources having the number of CCEs to which control information containing the amount of data can be mapped.

Control section 101 then outputs information on downlink data allocation resources to control information generating section 102. Furthermore, control section 101 outputs information on a coding rate to coding section 103. Furthermore, control section 101 determines a coding rate of transmission data (that is, downlink data) and outputs the coding rate to coding section 105. Furthermore, control section 101 outputs information on downlink data allocation resources and downlink control information allocation resources to mapping section 108. However, control section 101 performs control such that downlink data and downlink control information corresponding to the downlink data are mapped to an identical downlink component carrier.

Control information generating section 102 generates control information containing information on downlink data allocation resources and outputs the control information to coding section 103. The control information is generated for each downlink component carrier. Furthermore, the control information includes terminal IDs of the destination terminals to distinguish between resource allocation target terminals 200 when there are a plurality of resource allocation target terminals 200. For example, the control information includes a CRC bit masked with a terminal ID of a destination terminal. The control information may be called "downlink allocation control information."

Coding section 103 encodes control information according to the coding rate received from control section 101 and outputs the encoded control information to modulation section 104.

Modulation section 104 modulates the encoded control information and outputs the modulated signal obtained to mapping section 108.

Coding section 105 receives transmission data of each transmission destination terminal 200 (that is, downlink data) and coding rate information from control section 101 as input, encodes the transmission data and outputs the encoded transmission data to data transmission control section 106. However, when a plurality of downlink component carriers are assigned to transmission destination terminal 200, coding section 105 encodes transmission data transmitted in each downlink component carrier and outputs the encoded transmission data to data transmission control section 106.

Data transmission control section 106 retains the encoded transmission data at initial transmission and outputs the encoded transmission data to modulation section 107. The encoded transmission data is retained for each transmission destination terminal 200. Furthermore, transmission data to one transmission destination terminal 200 is retained for each downlink component carrier in which to transmit. This enables not only retransmission control of whole data transmitted to destination terminal 200 but also retransmission control for each downlink component carrier.

Furthermore, upon receiving NACK or DTX for downlink data transmitted in a certain downlink component carrier from retransmission control signal generating section 119, data transmission control section 106 outputs the retained data corresponding to this downlink component carrier to modulation section 107. Upon receiving ACK for the downlink data transmitted in a certain downlink component carrier from retransmission control signal generating section 119, data transmission control section 106 deletes the retained data corresponding to this downlink component carrier.

Modulation section 107 modulates the encoded transmission data received from data transmission control section 106 and outputs the modulated signal to mapping section 108.

Mapping section 108 maps the modulated signal of the control information received from modulation section 104 to resources indicated by downlink control information allocation resources received from control section 101 and outputs the resulting signal to IFFT section 109.

Furthermore, mapping section 108 maps the modulated signal of the transmission data received from modulation section 107 to resources indicated by the downlink data allocation resources received from control section 101 and outputs the resulting signal to IFFT section 109.

The control information and transmission data mapped to a plurality of subcarriers in a plurality of downlink component carriers in mapping section 108 are transformed from a frequency-domain signal into a time-domain signal in IFFT section 109, and with a CP added thereto in CP adding section 110. Then, the signal is transformed into an OFDM signal, subjected to transmission processing such as D/A conversion, amplification and up-conversion in radio transmitting section 111 and transmitted to terminal 200 via an antenna.

Radio receiving section 112 receives a response signal or reference signal transmitted from terminal 200 via the antenna and performs reception processing such as down-conversion, A/D conversion on the response signal or reference signal.

CP removing section 113 removes a CP added to the response signal or reference signal after the reception processing.

PUCCH extraction section 114 extracts an uplink control channel signal included in a PUCCH region from the received signal and outputs the extracted signal to despreading section 115.
This uplink control channel signal may include response signals and reference signals transmitted from terminal 200. The PUCCH region is defined as a block of PUCCH resources.

Despreading section 115 despreads a signal of a portion corresponding to a response signal using an orthogonal code sequence to be used by terminal 200 for secondary spreading in each of the PUCCH regions and outputs the despread signal to correlation processing section 117. Furthermore, despreading section 115 despreads a signal of a portion corresponding to a reference signal using an orthogonal code sequence to be used by terminal 200 for spreading reference signals in the respective uplink component carriers and outputs the despread signal to correlation processing section 117. However, when carrier aggregation is configured in processing target terminal 200, despreading section 115 configures two Walsh code sequences having a sequence length of 2, and when no carrier aggregation is configured in processing target terminal 200, despreading section 115 configures one Walsh code sequence having a sequence length of 4. Details of the despreading processing in despreading section 115 will be described later.

Sequence control section 116 generates a ZAC sequence that may be used to spread response signals and reference signals transmitted from terminal 200. Furthermore, sequence control section 116 identifies a correlation window in which signal components from terminal 200 should be included based on code resources (e.g., amount of cyclic shift) that may be used by terminal 200. Sequence control section 116 then outputs information indicating the identified correlation window and the generated ZAC sequence to correlation processing section 117.

Correlation processing section 117 obtains a correlation value between the signal received from despreading section 115 and the ZAC sequence that may be used for primary spreading in terminal 200, using the information indicating the correlation window received from sequence control section 116 and the ZAC sequence, and outputs the correlation value to decision section 118.

Decision section 118 decides which of ACK, NACK or DTX is indicated by the response signal transmitted from the terminal for the data transmitted in each of the downlink component carriers based on the correlation value received from correlation processing section 117. That is, when the correlation value received from correlation processing section 117 is equal to or below a certain threshold, decision section 118 decides that terminal 200 transmits neither ACK nor NACK using the resources. When the correlation value is equal to or above the threshold, decision section 118 further decides which phase point is indicated by the response signal through coherent detection. Decision section 118 then outputs the decision result in each PUCCH region to retransmission control signal generating section 119.

Retransmission control signal generating section 119 decides whether or not data transmitted through each downlink component carrier should be retransmitted, based on the information received from decision section 118 and generates a retransmission control signal based on the decision result.

[Configuration of Terminal]

Figure 6:
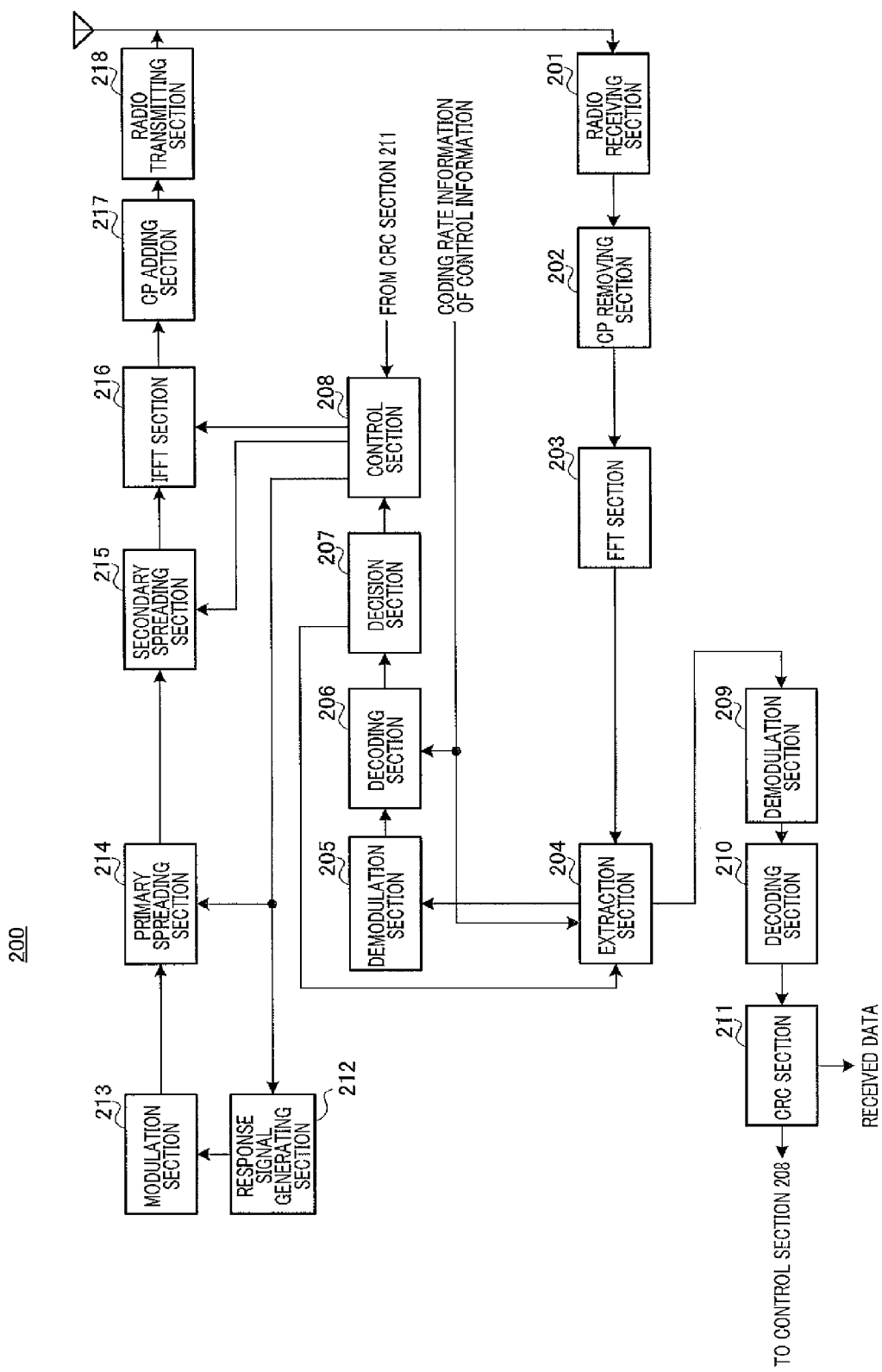
FIG. 6 is a block diagram illustrating a configuration of a terminal according to the embodiment of the present invention.

FIG. 6 is a block diagram illustrating a configuration of terminal 200 according to the embodiment of the present invention. In FIG. 6, terminal 200 includes radio receiving section 201, CP removing section 202, FFT section 203, extraction section 204, demodulation section 205, decoding section 206, decision section 207, control section 208, demodulation section 209, decoding section 210, CRC section 211, response signal generating section 212, modulation section 213, primary spreading section 214, secondary spreading section 215, IFFT section 216, CP adding section 217, and radio transmitting section 218.

Radio receiving section 201 receives an OFDM signal transmitted from base station 100 via an antenna and performs reception processing such as down-conversion, A/D conversion on the received OFDM signal.

CP removing section 202 removes a CP added to the OFDM signal after the reception processing.

FFT section 203 applies FFT to the received OFDM signal to transform the signal into a frequency-domain signal and outputs the received signal obtained to extraction section 204.

Extraction section 204 extracts a downlink control channel signal (PDCCH signal) from the received signal received from FFT section 203 according to coding rate information of the control information to be received. That is, since the number of CCEs constituting a downlink control information allocation resource varies depending on the coding rate, extraction section 204 extracts the downlink control channel signal using the number of CCEs corresponding to the coding rate as the extraction unit. Furthermore, the downlink control channel signal is extracted for each downlink component carrier. The extracted downlink control channel signal is outputted to demodulation section 205.

Furthermore, extraction section 204 extracts downlink data from the received signal based on information on downlink data allocation resources addressed to terminal 200 and received from decision section 207 and outputs the extracted downlink data to demodulation section 209.

Demodulation section 205 demodulates the downlink control channel signal received from extraction section 204 and outputs the demodulation result obtained to decoding section 206.

Decoding section 206 decodes the demodulation result received from demodulation section 205 according to the received coding rate information and outputs the decoding result obtained to decision section 207.

Decision section 207 makes a blind decision on whether or not the control information contained in the decoding result received from decoding section 206 is control information addressed to the terminal. This decision is made based on the decoding result corresponding to the above extraction unit as the unit. For example, decision section 207 demasks a CRC bit with the terminal ID of the terminal and decides that control information resulting in CRC=OK (no error) is control information addressed to the terminal. Decision section 207 then outputs information on downlink data allocation resources corresponding to the terminal contained in the control information addressed to the terminal to extraction section 204.

Furthermore, decision section 207 identifies CCEs to which the above-described control information addressed to the terminal is mapped in the downlink control channel of the primary component carrier (PCC) and outputs the identification information of the identified CCEs to control section 208.

Control section 208 identifies PUCCH resources (frequency/code) corresponding to CCEs indicated by the CCE identification information received from decision section 207 or PUCCH resources reported beforehand from base station 100. That is, control section 208 identifies PUCCH resources in the uplink control channel based on the CCE identification information or the resource information reported beforehand.

Control section 208 then determines the number of response signals to instruct response signal generating section 212 to generate, and the sequence length and the number of sequences of a Walsh code sequence to be configured in secondary spreading section 215 based on whether or not the terminal is performing operation of carrier aggregation. Furthermore, control section 208 determines which phase point should be configured in the response signal based on the situation of success/failure in receiving downlink data in the downlink component carrier received from CRC section 211.

Control section 208 then generates a ZAC sequence corresponding to the PUCCH resources to be used, determines the amount of cyclic shift to be used based on the PUCCH resources and outputs the amount of cyclic shift to primary spreading section 214.

Furthermore, control section 208 outputs the number of response signals to be generated and information on phase points to be configured to response signal generating section 212 and outputs the frequency resource information to IFFT section 216. Furthermore, control section 208 outputs one or two Walsh code sequences (that is, orthogonal code sequences) corresponding to the PUCCH resources to be used to secondary spreading section 215. Details of the control of PUCCH resources and phase points by control section 208 will be described later.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

As described above, radio receiving section 201, CP removing section 202, FFT section 203, extraction section 204, demodulation section 205, decoding section 206, demodulation section 209 and decoding section 210 function as a receiving section that receives downlink allocation control information (PDCCH signal) transmitted through a downlink control channel of each downlink component carrier and downlink data transmitted through a downlink data channel (downlink data allocation resources) indicated by the downlink allocation control information.

CRC section 211 generates the downlink data decoded and received from decoding section 210, performs error detection per downlink component carrier using a CRC and outputs ACK when CRC=OK (no error) and NACK when CRC=NO (error) to control section 208. Furthermore, when CRC=OK (no error), CRC section 211 outputs the decoded downlink data as received data.

Response signal generating section 212 generates one or two response signals and one reference signal based on the number of response signals and phase points instructed from control section 208 and outputs these signals to modulation section 213.

Modulation section 213 modulates the response signals received from response signal generating section 212 and outputs the response signals to primary spreading section 214.

Primary spreading section 214 primary-spreads the response signal and reference signal based on the ZAC sequence and the amount of cyclic shift configured by control section 208 and outputs the primary-spread response signal and reference signal to secondary spreading section 215. That is, primary spreading section 214 multiplies the response signal and reference signal by a ZAC sequence corresponding to the amount of cyclic shift according to an instruction from control section 208. Here, a one-symbol response signal is converted to a response signal sequence having the same sequence length as the ZAC sequence (e.g., 12).

Secondary spreading section 215 secondary-spreads the response signal and reference signal using an orthogonal code sequence configured by control section 208 and outputs the secondary-spread signals to IFFT section 216. That is, secondary spreading section 215 multiplies the primary-spread response signal and reference signal by an orthogonal code sequence corresponding to PUCCH resources selected in control section 208 and outputs the spread signals to IFFT section 216. In other words, response signal sequences having the same sequence length as the ZAC sequence (e.g., 12) are handled as one block and multiplied by each component of the orthogonal code sequence. As a result, as many response signal sequences as the sequence length of the orthogonal code sequence (e.g., 2 or 4) are generated. However, when terminal 200 is not operating in carrier aggregation, secondary spreading section 215 spreads one response signal received from primary spreading section 214 with an orthogonal code sequence having a sequence length of 4. When terminal 200 is operating in carrier aggregation, secondary spreading section 215 spreads two response signals received from primary spreading section 214 with an orthogonal code sequence having a sequence length of 2. The secondary spreading section may also be called "sequence multiplication section."

CP adding section 217 adds the same signal as the tail end portion of the IFFT-processed signal to the beginning of the signal as a CP.

Radio transmitting section 218 performs transmission processing such as D/A conversion, amplification and up-conversion on the received signal. Radio transmitting section 218 then transmits signals from an antenna to base station 100.

[Operations of Base Station 100 and Terminal 200]

Operations of base station 100 and terminal 200 configured as described above will be described. In the following description, terminal 200 transmits a signal to base station 100 using PUCCH resources according to success/failure in receiving downlink allocation control information and downlink data (that is, situation in which an uplink response signal to be transmitted is generated).

[Response by Terminal 200]

Decision section 207 reports the detection situation (success/failure in reception) of control information addressed to the terminal (that is, downlink allocation control information) to control section 208. Furthermore, CRC section 211 reports the situation of success/failure in receiving downlink data in each downlink component carrier to control section 208. Control section 208 instructs response signal generating section 212 to generate one or two response signals based on the information (i.e., success/failure in receiving downlink allocation control information and downlink data) received from decision section 207 and CRC section 211 and instructs secondary spreading section 215 on the sequence length of the Walsh code sequence to be configured.

[Reception of Response Signal in Base Station 100]

Despreading section 115 despreads the received signal using a Walsh code sequence having a sequence length of 4 or sequence length of 2 in accordance with the number of downlink component carriers configured in terminal 200 and extracts one or two response signals.

Next, response signal generation examples 1 to 3 in terminal 200 will be described.

<Response Signal Generation Example 1>

FIG. 7 is a diagram illustrating response signal generation example 1. As shown in FIG. 7, terminal 200 controls the number of response signals (ACK/NACK symbols) generated and the sequence length of a Walsh code sequence depending on whether the number of downlink component carriers (number of downlink CCs) configured in terminal 200 is one or two.

[When Number of Downlink CCs Configured in Terminal 200 is One (FIG. 7A)]

Figure 7B:
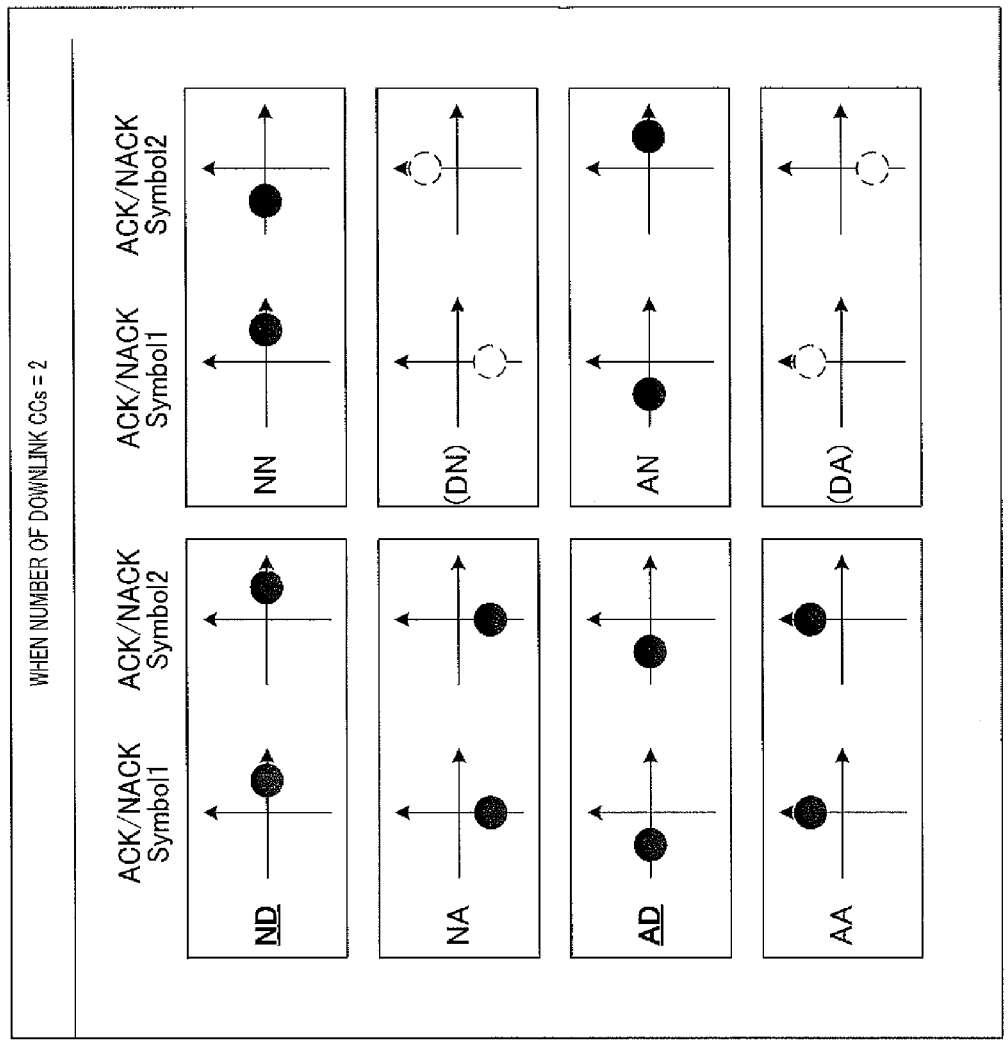
FIG. 7 is a diagram illustrating the correspondence between the number of downlink CCs and phase points of response signals according to the embodiment of the present invention (response signal generation example 1)
Figure 7A:
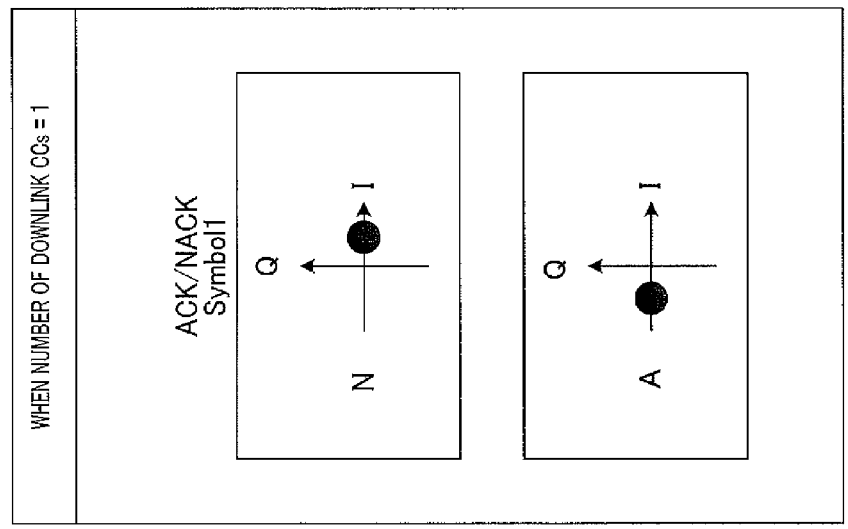

If one downlink allocation control information portion is received in a case where the number of downlink CCs configured in terminal 200 is one, response signal generating section 212 generates one response signal (ACK/NACK symbol 1) as shown in FIG. 7A.

At this time, control section 208 configures a phase point of one of (−1, 0) and (1, 0) in a response signal based on success/failure in receiving downlink data corresponding to the received downlink allocation control information (ACK or NACK). To be more specific, as shown in FIG. 7A, NACK ("N") is associated with phase point (1, 0) of ACK/NACK symbol 1 and ACK ("A") is associated with phase point (−1, 0) of and ACK/NACK symbol 1.

Furthermore, terminal 200 transmits a response signal using PUCCH resources associated with the numbers of CCEs occupied by the received downlink allocation control information. To be more specific, control section 208 determines that a Walsh code sequence having a sequence length of 4 corresponding to the PUCCH resources associated with the numbers of CCEs occupied by the received downlink allocation control information (e.g., $W_0$, $W_1$, $W_2$, $W_3$ shown in FIG. 1) should be used as a spreading code to spread a response signal (ACK/NACK symbol 1).

Thus, while control section 208 instructs response signal generating section 212 to generate one response signal, control section 208 configures a Walsh code sequence having a sequence length of 4 corresponding to the PUCCH resources for secondary spreading section 215.

Thus, when the number of downlink CCs configured in terminal 200 is one (e.g., when performing communication without carrier aggregation), response signal generating section 212 generates one response signal (ACK/NACK symbol 1) based on success/failure in receiving downlink data corresponding to the downlink component carrier (primary component carrier) configured in terminal 200 and the configuration rule of phase points of response signals shown in FIG. 7A. Furthermore, secondary spreading section 215 spreads one response signal (ACK/NACK symbol 1) using a Walsh code sequence having a sequence length of 4 defined as PUCCH resources associated with the downlink control channel (that is, CCEs) of the primary component carrier (PCC) as shown in FIG. 1.

[When Number of Downlink CCs Configured in Terminal 200 is Two (FIG. 7B)]

If downlink allocation control information is received through a primary component carrier (PCC) in a case where the number of downlink CCs configured in terminal 200 is two, response signal generating section 212 generates two response signals (ACK/NACK symbol 1 and ACK/NACK symbol 2) as shown in FIG. 7B.

At this time, control section 208 configures one of phase points (−1, 0), (1, 0), (0, j) and (0, −j) in each of the two response signals based on downlink allocation control information and success/failure (ACK, NACK or DTX) in receiving downlink data corresponding to the downlink allocation control information.

That is, control section 208 determines phase points of response signals (ACK/NACK symbol 1 and ACK/NACK symbol 2) using the configuration rule of phase points of response signals shown in FIG. 7B based on the downlink allocation control information addressed to terminal 200 and a pattern (state) of success/failure in receiving downlink data corresponding to the downlink allocation control information (error detection result). According to the configuration rule of phase points of response signals shown in FIG. 7B, the downlink allocation control information and pattern candidates for success/failure in receiving downlink data corresponding to the downlink allocation control information, and phase points of response signals are associated with each other. However, terminal 200 does not generate any response signal when downlink allocation control information is not received through PCC (that is, when downlink allocation control information is received only in a downlink component carrier other than the PCC (i.e., Secondary Component carrier: SCC) or not even one downlink allocation control information is received). That is, as shown in FIG. 7B, control section 208 does not determine any phase point for "DN" and "DA."

For example, in FIG. 7B, a pattern candidate "NA" indicates a state in which terminal 200 has received downlink allocation control information through both PCC and SCC but failed to decode downlink data transmitted in PCC (NACK) and successfully decoded downlink data transmitted through SCCs (ACK). Furthermore, in FIG. 7B, "NA" is associated with phase point (0, −j) of ACK/NACK symbol 1 and phase point (0, −j) of ACK/NACK symbol 2. Similarly, for example, in FIG. 7B, a pattern candidate "AD" indicates a state in which terminal 200 succeeds (i.e., ACK) in receiving (decoding) downlink allocation control information and downlink data in PCC but has not received (i.e., DTX) downlink allocation control information in SCCs. Furthermore, in FIG. 7B, "AD" is associated with phase point (−1, 0) of ACK/NACK symbol 1 and phase point (−1, 0) of ACK/NACK symbol 2. Similarly, the other pattern candidates for success/failure in receiving downlink allocation control information and downlink data are associated with phase points of response signals shown in FIG. 7B.

Furthermore, terminal 200 transmits response signals using PUCCH resources associated with the numbers of CCEs occupied by downlink allocation control information received through PCC. For example, of the Walsh code sequence (e.g., $W_0$, $W_1$, $W_2$, $W_3$ shown in FIG. 1) having a sequence length of 4 corresponding to PUCCH resources associated with the numbers of CCEs occupied by downlink allocation control information received through PCC, control section 208 determines that the first two components (that is, sequence length 2) should be used as spreading codes (e.g., $W_{0,0}$ and $W_{0,1}$ shown in FIG. 3) to spread the first response signal (ACK/NACK symbol 1) and the last two components (that is, sequence length 2) should be used as spreading codes (e.g., $W_{1,0}$ and $W_{1,1}$ shown in FIG. 3) to spread the second response signal (ACK/NACK symbol 2). That is, in FIG. 3, spreading codes ($W_{0,0}$, $W_{0,1}$) used to spread ACK/NACK symbol 1 and spreading codes ($W_{1,0}$, $W_{1,1}$) used to spread ACK/NACK symbol 2 are partial sequences obtained respectively by dividing the Walsh code sequence ($W_0$, $W_1$, $W_2$, $W_3$) used to spread ACK/NACK symbol 1 in FIG. 1. To be more specific, there are relationships of $W_{0,0}=W_0$, $W_{0,1}=W_1$, $W_{1,0}=W_2$, $W_{1,1}=W_3$ in FIG. 1 and FIG. 3.

Thus, when the number of downlink CCs configured in terminal 200 is two, control section 208 instructs response signal generating section 212 to generate two response signals. Furthermore, control section 208 extracts the first two components and last two components from the Walsh code sequence having a sequence length of 4 corresponding to PUCCH resources associated with the "numbers of CCEs occupied by downlink allocation control information received through PCC" and configures two Walsh code sequences having a sequence length of 2 for secondary spreading section 215.

Figure 3:
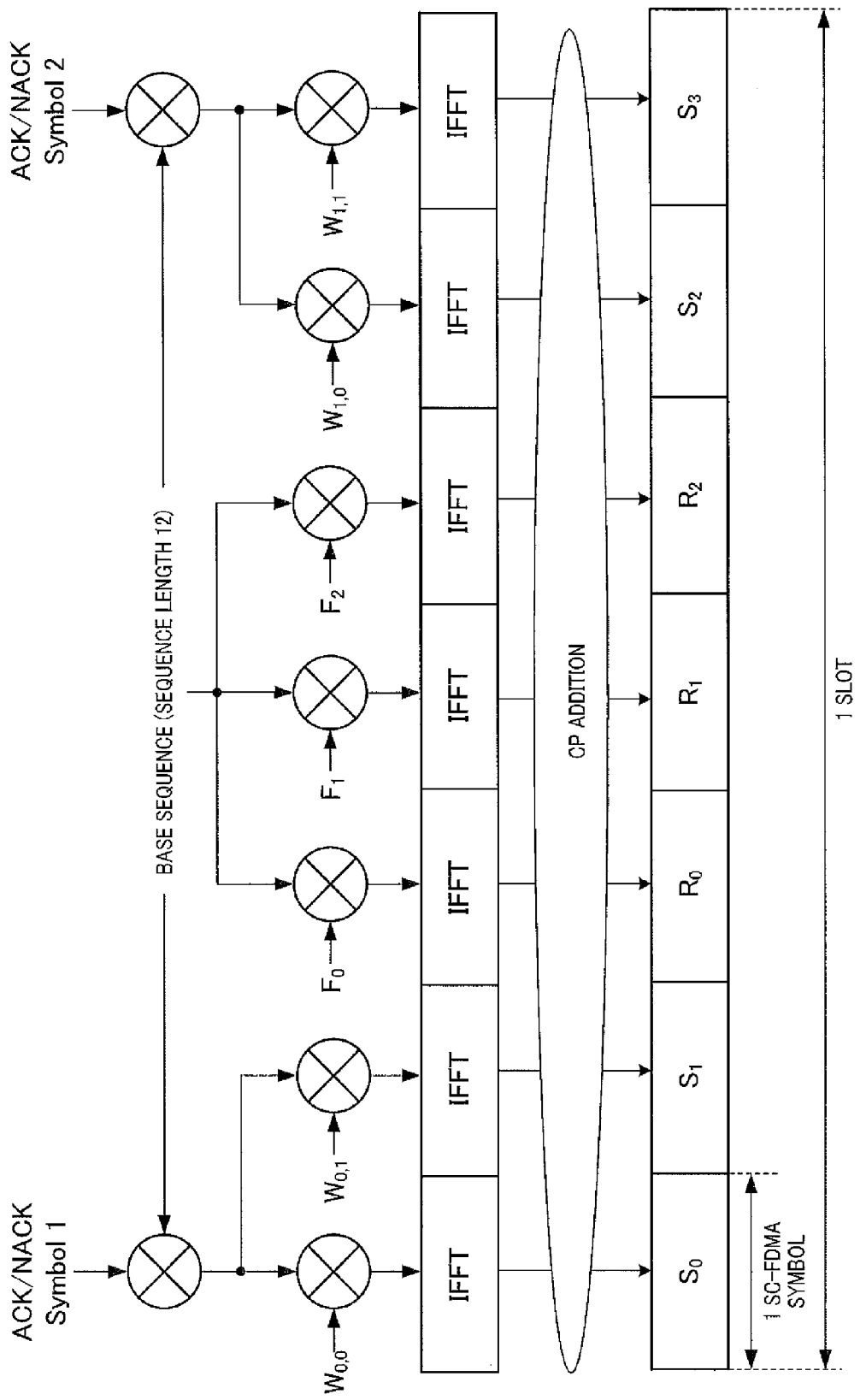
FIG. 3 is a diagram illustrating a method of spreading response signals and reference signals using SF reduction.

That is, when the number of downlink CCs configured in terminal 200 is two (e.g., when communication using carrier aggregation is performed), response signal generating section 212 generates two response signals (ACK/NACK symbol 1 and ACK/NACK symbol 2) based on success/failure in receiving downlink allocation control information and downlink data corresponding to each of a plurality of downlink component carriers configured in terminal 200 and the configuration rules of phase points of response signals shown in FIG. 7B. Furthermore, as shown in FIG. 3, secondary spreading section 215 spreads two response signals (ACK/NACK symbol 1 and ACK/NACK symbol 2) respectively with two Walsh code sequences having a sequence length of 2 (that is, two Walsh code sequences, the sum of the sequence lengths of which becomes a sequence length of 4 of the Walsh code sequence used in FIG. 1).

Next, a description will be given of a period during which a "difference occurs in recognition regarding the configuration of the number of downlink CCs" between base station 100 and terminal 200. For example, a case will be described where base station 100 recognizes that the number of downlink CCs configured in terminal 200 is one while terminal 200 recognizes that the number of downlink CCs configured in terminal 200 is two (e.g., a period during which a "difference occurs in recognition regarding the configuration of the number of CCs" shown in FIG. 4). For this period during which a "difference occurs in recognition regarding the configuration of the number of CCs," terminal 200 performs reception processing on downlink allocation control information in two downlink component carriers (PCC and SCC). However, since base station 100 actually transmits downlink allocation control information using only one downlink component carrier (PCC), terminal 200 never receives downlink allocation control information in a downlink component carrier (SCC) other than PCC. Thus, the situation of success/failure in reception in SCCs to be determined in terminal 200 becomes DTX.

Furthermore, for example, a case (not shown) will be described where base station 100 recognizes the number of downlink CCs configured in terminal 200 is two while terminal 200 recognizes the number of downlink CCs configured in terminal 200 is one. For a period during which a "difference occurs in recognition in the number of downlink CCs," base station 100 transmits downlink allocation control information portions in two downlink component carriers (PCC and SCC), respectively. However, terminal 200 performs reception processing on downlink allocation control information using only one downlink component carrier (PCC). Thus, terminal 200 never receives downlink allocation control information in a downlink component carrier (SCC) other than PCC in this case, either. Therefore, the situation of success/failure in reception with respect to SCC in terminal 200 to be determined in base station 100 is DTX.

That is, when the aforementioned "difference in recognition regarding the configuration of the number of downlink CCs" (that is, a difference in recognition of the presence or absence of carrier aggregation) occurs, the response signal in SCC is always DTX. That is, when there is a "difference in recognition regarding the configuration of the number of downlink CCs," the pattern of success/failure in receiving downlink allocation control information and downlink data addressed to terminal 200 (error detection result) in communication using carrier aggregation is one of "AD" and "ND."

In contrast, what should be noted is that according to the configuration rule of phase points of response signals in response signal generation example 1, the phase point of one response signal (ACK/NACK symbol 1) associated with an arbitrary pattern of success/failure in receiving downlink allocation control information and downlink data in communication without carrier aggregation (FIG. 7A) is configured to be identical to the respective phase points of two response signals (ACK/NACK symbol 1 and ACK/NACK symbol 2) associated with a candidate pattern whose pattern of success/failure in reception in PCC in communication using carrier aggregation (FIG. 7B) is identical to the above arbitrary pattern in communication without carrier aggregation (FIG. 7A) and which corresponds to a state in which downlink allocation control information is not received through SCC other than PCC (i.e., DTX).

In other words, success/failure in receiving downlink allocation control information and downlink data is indicated by a phase point of a response signal, and in communication without carrier aggregation (FIG. 7A), the phase point of one response signal indicating success/failure in reception with respect to PCC is identical to respective phase points of two response signals indicating success/failure in reception with respect to PCC in communication using carrier aggregation (FIG. 7B) that is the same as success/failure in the reception with respect to PCC in communication without carrier aggregation and success/failure in reception which corresponds to a state in which downlink allocation control information is not received using component carriers (SCCs) other than PCCs (i.e., DTX).

For example, a phase point of one response signal associated with arbitrary pattern "N" in communication without carrier aggregation (FIG. 7A) and respective phase points of two response signals associated with a candidate pattern ("ND") whose pattern of success/failure in reception in PCC in communication using carrier aggregation (FIG. 7B) is identical to the arbitrary pattern ("N") in communication without carrier aggregation (FIG. 7A) and which corresponds to a state in which downlink allocation control information is not received through SCCs other than PCC (i.e., DTX) are identical phase point (1, 0). Identical phase point (−1, 0) is likewise configured for "A" in FIG. 7A and "AD" in FIG. 7B.

Furthermore, as described above, in communication using carrier aggregation (FIG. 3), spreading codes ($W_{0,0}$, $W_{0,1}$) used to spread ACK/NACK symbol 1 and spreading codes ($W_{1,0}$, $W_{1,1}$) used to spread ACK/NACK symbol 2 are partial sequences obtained by dividing a Walsh code sequence ($W_0$, $W_1$, $W_2$, $W_3$) used to spread ACK/NACK symbol 1 in communication without carrier aggregation (FIG. 1). Furthermore, response signals (ACK/NACK symbol 1 and ACK/NACK symbol 2) are primary-spread with a ZAC sequence (base sequence) with the same amount of cyclic shift in both FIG. 1 and FIG. 3.

That is, terminal 200 performs transmission processing on two response signals including one response signal corresponding to "N" (or "A") in communication without carrier aggregation (FIG. 1 and FIG. 7A) and one response signal corresponding to "ND" (or "AD") in communication using carrier aggregation (FIG. 3 and FIG. 7B) using the same amount of cyclic shift, Walsh code sequence and phase point. That is, the transmission waveform of ACK/NACK symbol 1 corresponding to "N" (or "A") in communication without carrier aggregation (FIG. 1 and FIG. 7A) is substantially identical to the transmission waveforms of ACK/NACK symbol 1 and ACK/NACK symbol 2 corresponding to "ND" (or "AD") in communication using carrier aggregation (FIG. 3 and FIG. 7B).

Base station 100 despreads the received signal using a Walsh code sequence having a sequence length of 4 or a sequence length of 2 in accordance with the number of downlink component carriers configured in terminal 200 and extracts one or two response signals.

A case will be described as an example where base station 100 recognizes the number of downlink CCs configured in terminal 200 as two (with carrier aggregation) while terminal 200 recognizes the number of downlink CCs configured in terminal 200 as one (no carrier aggregation) (not shown). That is, base station 100 transmits downlink allocation control information and downlink data in both PCC and SCC and terminal 200 receives downlink allocation control information and downlink data in only PCC. Furthermore, suppose terminal 200 succeeds in decoding downlink data received through PCC (PCC: ACK). In this case, terminal 200 generates a response signal corresponding to ACK ("A") (phase point (−1, 0) of ACK/NACK symbol 1 in FIG. 7A) and spreads ACK/NACK symbol 1 using a Walsh code sequence having a sequence length of 4 ($W_0$, $W_1$, $W_2$, $W_3$) as shown in FIG. 1. Base station 100 then feeds back spread ACK/NACK symbol 1 to base station 100.

On the other hand, since base station 100 recognizes that carrier aggregation is present, base station 100 despreads the signal of the portion corresponding to the received response signal (phase point (−1, 0)) using a Walsh code sequence having a sequence length of 2 ($W_{0,0}=W_0$, $W_{0,1}=W_1$) and a Walsh code sequence having a sequence length of 2 ($W_{1,0}=W_2$, $W_{1,1}=W_3$) resulting from dividing the Walsh code sequence having a sequence length of 4 used in terminal 200 into first two components and last two components. In this way, base station 100 extracts a symbol at phase point (−1, 0) as ACK/NACK symbol 1 shown in FIG. 3 and extracts a symbol at phase point (−1, 0) as ACK/NACK symbol 2 shown in FIG. 3. Thus, according to FIG. 7B, base station 100 determines that the response signal from terminal 200 is "AD," that is, reception of downlink data in PCC is successful (ACK) in terminal 200, but downlink allocation control information is not received through SCC (i.e., DTX). Therefore, base station 100 can determine that retransmission of downlink data transmitted in PCC is not necessary but retransmission of downlink data transmitted in SCC is necessary. That is, base station 100 can normally determine that terminal 200 has received the data actually transmitted in PCC.

Thus, for a period during which a "difference occurs in recognition regarding the configuration of the number of downlink CCs," response signals corresponding to success/failure and "AD" (or "N" and "ND") in receiving a signal in a downlink component carrier that can be determined by base station 100 and terminal 200 are transmitted in an identical transmission waveform. Thus, even when terminal 200 transmits one response signal corresponding to "A" (or "N") shown in FIG. 7A, base station 100 can recognize that two response signals corresponding to "AD" ("ND") shown in FIG. 7B have been received.

In the case where base station 100 recognizes that carrier aggregation is not configured in terminal 200 and terminal 200 recognizes that carrier aggregation is configured in terminal 200 (FIG. 4), terminal 200 also normally transmits an uplink response signal to base station 100 in a similar manner.

Thus, according to response signal generation example 1, even for a period during which a difference occurs in recognition between base station 100 and terminal 200 regarding the configuration of the number of downlink component carriers configured in the terminal, no difference occurs in recognition of success/failure in receiving the downlink allocation control information and downlink data (response signal). That is, even for a period during which a difference occurs in recognition between base station 100 and terminal 200 regarding the configuration of the number of downlink component carriers configured in terminal 200, an uplink response signal is normally transmitted from terminal 200 to base station 100.

<Response Signal Generation Example 2>

Unlike response signal generation example 1, response signal generation example 2 assumes that PUCCH resources to be used for terminal 200 to transmit a response signal are reported beforehand from base station 100.

Figure 8A:
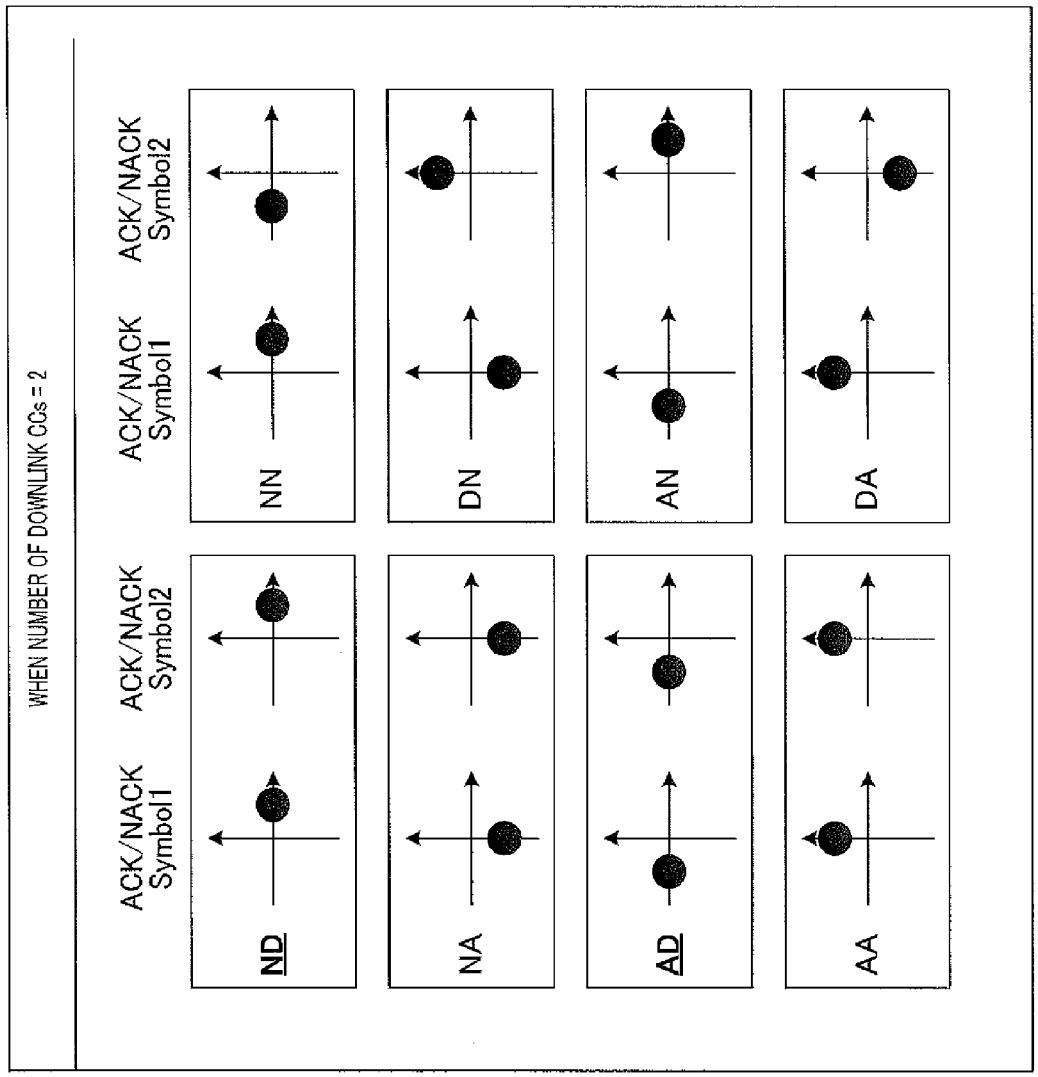
FIG. 8A is a diagram illustrating the correspondence between the number of downlink CCs and phase points of response signals according to the embodiment of the present invention (response signal generation example 2)
Figure 8B:
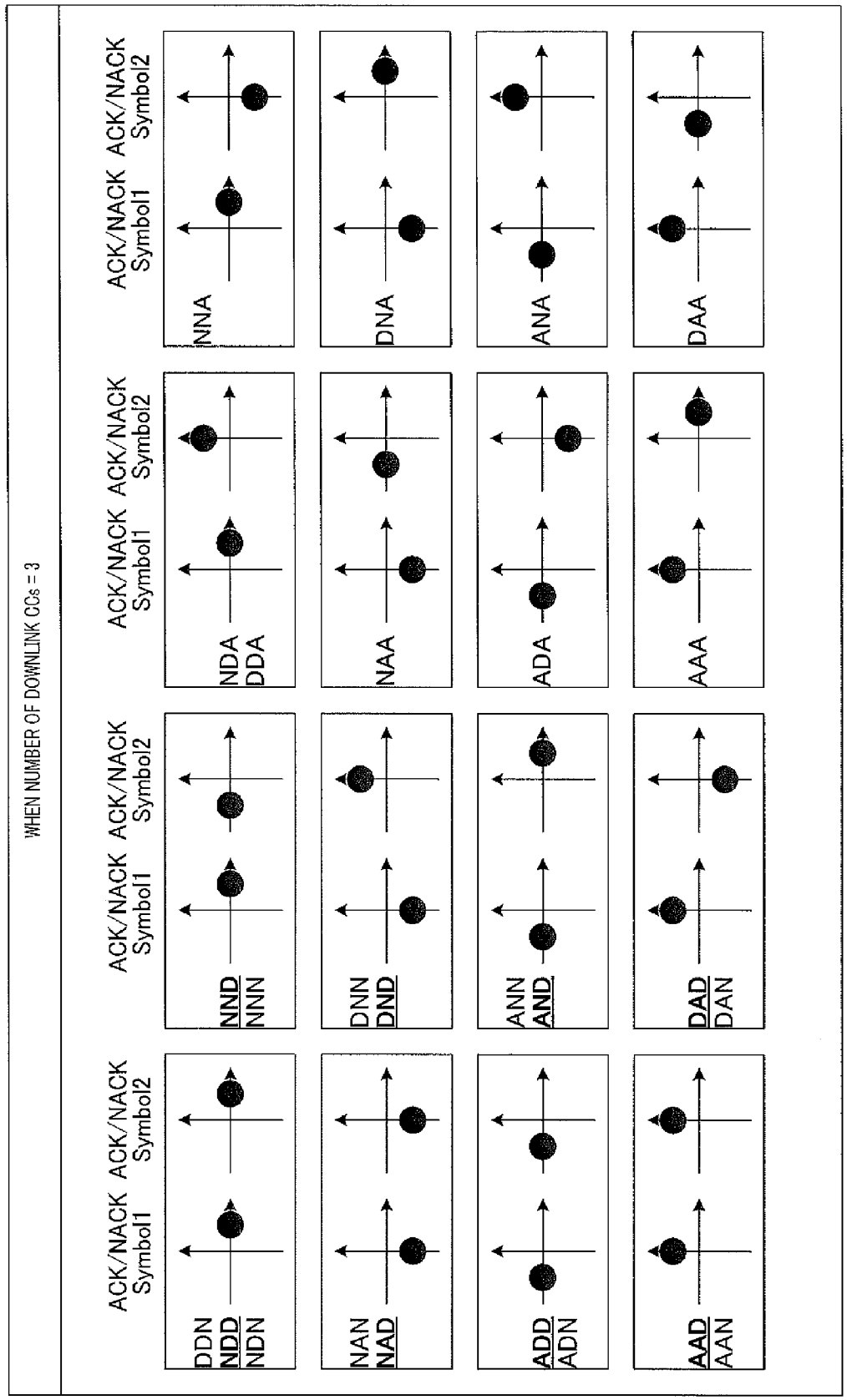
FIG. 8B is a diagram illustrating the correspondence between the number of downlink CCs and phase points of response signals according to the embodiment of the present invention (response signal generation example 2)

FIG. 8A and FIG. 8B are diagrams illustrating response signal generation example 2. However, in response signal generation example 2, if the number of downlink CCs configured in terminal 200 is one, a response signal generation method similar to response signal generation example 1 (FIG. 7A) is used.

Terminal 200 controls the number of response signals (ACK/NACK symbols) generated and the sequence length of a Walsh code sequence depending on whether the number of downlink CCs configured in terminal 200 is one or two or above.

[When the Number of Downlink CCs Configured in Terminal 200 is One (FIG. 7A)]

Upon receiving one downlink allocation control information portion in a case where the number of downlink CCs configured in terminal 200 is one, response signal generating section 212 generates one response signal (ACK/NACK symbol 1) in the same way as in response signal generation example 1 (FIG. 7A). At this time, control section 208 configures one of phase points (−1, 0) and (1, 0) in the response signal based on success/failure (ACK or NACK) in receiving downlink data corresponding to the received downlink allocation control information.

Furthermore, terminal 200 transmits response signals using PUCCH resources reported beforehand from base station 100. To be more specific, control section 208 determines that a Walsh code sequence having a sequence length of 4 (e.g., $W_0$, $W_1$, $W_2$, $W_3$ shown in FIG. 1) corresponding to PUCCH resources reported beforehand from base station 100 should be used as a spreading code to spread a response signal (ACK/NACK symbol 1).

Thus, in the case where the number of downlink CCs configured in terminal 200 is one (e.g., when performing communication without carrier aggregation), while control section 208 instructs response signal generating section 212 to generate one response signal as in the case of response signal generation example 1, control section 208 configures a Walsh code sequence having a sequence length of 4 corresponding to PUCCH resources for secondary spreading section 215.

[When the Number of Downlink CCs Configured in Terminal 200 is Two or More (FIG. 8A and FIG. 8B)]

If even one downlink allocation control information portion is received through any one downlink component carrier in a case where the number of downlink CCs configured in terminal 200 is two, response signal generating section 212 generates two response signals (ACK/NACK symbol 1 and ACK/NACK symbol 2) as shown in FIG. 8A. At this time, control section 208 configures any one of phase points (−1, 0), (1, 0), (0, j) and (0, −j) in each of the two response signals based on success/failure (ACK, NACK or DTX) in receiving downlink allocation control information and downlink data.

Furthermore, if even one downlink allocation control information portion is received through any one downlink component carrier in a case where the number of downlink CCs configured in terminal 200 is three, response signal generating section 212 generates two response signals (ACK/NACK symbol 1 and ACK/NACK symbol 2) as shown in FIG. 8B. At this time, control section 208 configures any one of phase points (−1, 0), (1, 0), (0, j) and (0, −j) in each of the two response signals based on success/failure (ACK, NACK or DTX) in receiving downlink allocation control information and downlink data.

For example, in FIG. 8B, a pattern candidate "NAD" for success/failure in receiving downlink allocation control information and downlink data corresponding to the downlink allocation control information indicates a state in which terminal 200 (receives downlink allocation control information and) fails to decode downlink data transmitted in PCC (NACK), (receives downlink allocation control information and) succeeds in decoding the downlink data transmitted in the first downlink component carrier of two SCCs (ACK), and does not receive downlink allocation control information in the second downlink component carrier (i.e., DTX). Furthermore, in FIG. 8B, "NAD" is associated with phase point (0, −j) of ACK/NACK symbol 1 and phase point (0, −j) of ACK/NACK symbol 2. Similarly, in FIG. 8B, a pattern candidate "ADD" indicates a state in which terminal 200 (receives downlink allocation control information and) succeeds in decoding downlink data transmitted in PCC (ACK) and receives no downlink allocation control information in the two SCCs (i.e., DTX). Furthermore, in FIG. 8B, "ADD" is associated with phase point (−1, 0) of ACK/NACK symbol 1 and phase point (−1, 0) of ACK/NACK symbol 2. Similarly, the other pattern candidates for success/failure in receiving downlink allocation control information and downlink data shown in FIG. 8B are associated with phase points of response signals.

That is, control section 208 determines phase points of response signals (ACK/NACK symbol 1 and ACK/NACK symbol 2) using the configuration rule of response signal phase points shown in FIG. 8A or FIG. 8B based on a pattern (state) of success/failure in receiving downlink allocation control information and downlink data addressed to terminal 200 (error detection result).

Furthermore, terminal 200 transmits response signals using PUCCH resources reported beforehand from base station 100. For example, control section 208 determines that the first two components (i.e., sequence length 2) of a Walsh code sequence having a sequence length of 4 corresponding to PUCCH resources reported beforehand from base station 100 (e.g., $W_0$, $W_1$, $W_2$, $W_3$ shown in FIG. 1) should be used as spreading codes (e.g., $W_{0,0}$, $W_{0,1}$ shown in FIG. 3) to spread the first response signal (ACK/NACK symbol 1) and the last two components (i.e., sequence length 2) should be used as spreading codes (e.g., $W_{1,0}$, $W_{1,1}$ shown in FIG. 3) to spread the second response signal (ACK/NACK symbol 2).

Thus, when the number of downlink CCs configured in terminal 200 is two or more (e.g., when performing communication using carrier aggregation), control section 208 instructs response signal generating section 212 to generate two response signals as in the case of response signal generation example 1. Furthermore, control section 208 extracts the first two components and the last two components from the Walsh code sequence having a sequence length of 4 corresponding to PUCCH resources reported beforehand from base station 100 and configures two Walsh code sequences having a sequence length of 2 for secondary spreading section 215.

Here, as in the case of response signal generation example 1, the phase point of one response signal (ACK/NACK symbol 1) associated with an arbitrary pattern of success/failure in receiving downlink allocation control information and downlink data in communication without carrier aggregation (FIG. 7A) is configured to be identical to respective phase points of two response signals (ACK/NACK symbol 1 and ACK/NACK symbol 2) associated with a candidate pattern whose pattern of success/failure in reception in PCC in communication using carrier aggregation (FIG. 8A and FIG. 8B) is identical to the above-described arbitrary pattern in communication without carrier aggregation (FIG. 7A) and which corresponds to a state in which downlink allocation control information is not received through all SCCs other than PCC (i.e., DTX).

For example, the phase point of one response signal associated with an arbitrary pattern "N" in communication without carrier aggregation (FIG. 7A) and respective phase points of two response signals associated with a candidate pattern ("ND" shown in FIG. 8A and "NDD" shown in FIG. 8B) whose pattern of success/failure in reception in PCC in communication using carrier aggregation (FIG. 8A and FIG. 8B) is identical to the above-described arbitrary pattern ("N") in communication without carrier aggregation (FIG. 7A) and which corresponds to a state in which downlink allocation control information is not received through all SCCs other than PCC (i.e., DTX) are configured to be identical phase point (1, 0). Identical phase point (−1, 0) is configured for "A" shown in FIG. 7A, "AD" shown in FIG. 8A and "ADD" shown in FIG. 8B in a similar manner.

As in the case of response signal generation example 1, in communication using carrier aggregation (FIG. 3), spreading codes ($W_{0,0}$, $W_{0,1}$) used to spread ACK/NACK symbol 1 and spreading codes ($W_{1,0}$, $W_{1,1}$) used to spread ACK/NACK symbol 2 are partial sequences obtained by dividing a Walsh code sequence ($W_0$, $W_1$, $W_2$, $W_3$) used to spread ACK/NACK symbol 1 in communication without carrier aggregation (FIG. 1).

That is, as in the case of response signal generation example 1, the transmission waveform of ACK/NACK symbol 1 corresponding to "N" (or "A") in communication without carrier aggregation (FIG. 1 and FIG. 7A) is identical to the transmission waveforms of ACK/NACK symbol 1 and ACK/

NACK symbol 2 corresponding to "ND" and "NDD" (or "AD" and "ADD") in communication using carrier aggregation (FIG. 3, FIG. 8A and FIG. 8B).

As in the case of response signal generation example 1, this prevents a "difference in recognition of response signals" from occurring between base station 100 and terminal 200 even for a period during which a "difference in recognition regarding the configuration of the number of downlink CCs" occurs. That is, an uplink response signal is normally transmitted from terminal 200 to base station 100 even for a period during which a difference occurs in recognition between base station 100 and terminal 200 regarding the configuration of the number of downlink component carriers configured in terminal 200.

Furthermore, according to the configuration rule of phase points of response signals in response signal generation example 2, a pair of phase points of two response signals associated with an arbitrary pattern of success/failure in receiving downlink allocation control information and downlink data in communication using carrier aggregation using M (M is a natural number equal to 2 or above, 2 in FIG. 8A) downlink component carriers, and a pair of phase points of two response signals associated with a candidate pattern in communication using carrier aggregation using N (N is a natural number greater than M, and N is three in FIG. 8B) downlink component carriers whose pattern of success/failure in reception in the downlink component carriers identical to the M (two in FIG. 8A) downlink component carriers in communication without carrier aggregation is identical to the above-described arbitrary pattern and which corresponds to a state in which downlink allocation control information is not received through all (N-M) (one in FIG. 8A and FIG. 8B) downlink component carriers other than the M (two in FIG. 8A) downlink component carriers (i.e., DTX) are configured to be identical.

When two downlink component carriers are configured in terminal 200 (FIG. 8A), success/failure in receiving downlink allocation control information and downlink data is expressed by "XX" (X is one of "A," "N" and "D" shown in FIG. 8A). In this case, when two downlink component carriers are configured in terminal 200 (FIG. 8A), the pair of phase points of two response signals corresponding to "XX" is identical to the pair of phase points of two response signals corresponding to success/failure "XXD" in receiving downlink allocation control information and downlink data when three downlink component carriers are configured in terminal 200 (FIG. 8B). For example, the pair of phase points of two response signals associated with a pattern candidate "NN" (that is, above XX=NN) shown in FIG. 8A and the pair of phase points of two response signals associated with a pattern candidate "NND" shown in FIG. 8B are an identical pair of phase point (1, 0) and phase point (−1, 0). The same applies to pattern candidates other than "NN" shown in FIG. 8A.

Thus, in response signal generation example 2, when the number of downlink CCs configured in terminal 200 in communication using carrier aggregation is changed, it is possible to prevent a "difference in recognition of response signals" from occurring between base station 100 and terminal 200 even for a period during which a "difference in recognition regarding the configuration of the number of downlink CCs" occurs between base station 100 and terminal 200.

Thus, according to response signal generation example 2 as well as response signal generation example 1, no difference occurs in recognition of success/failure in receiving each downlink allocation control information portion and downlink data (response signals) even for a period during which a "difference in recognition regarding the configuration of the number of downlink CCs" occurs in configuring the presence or absence of carrier aggregation. Furthermore, according to response signal generation example 2, no difference occurs in recognition of success/failure in receiving each downlink allocation control information portion and downlink data (response signals) even for a period during which a "difference in recognition regarding the configuration of the number of downlink CCs" occurs in changing the number of downlink CCs in communication using carrier aggregation. Therefore, an uplink response signal is normally transmitted from terminal 200 to base station 100 even for a period during which a "difference in recognition regarding the configuration of the number of downlink CCs" occurs in any one of a case where the presence or absence of carrier aggregation is configured and a case where the number of downlink CCs in communication using carrier aggregation is changed.

<Response Signal Generation Example 3>

As in the case of response signal generation example 2, response signal generation example 3 assumes that PUCCH resources used by terminal 200 to transmit response signals are reported beforehand from base station 100. Furthermore, response signal generation example 3 is different from response signal generation examples 1 and 2 in that base station 100 transmits two downlink data portions to terminal 200 in one downlink component carrier through space division multiplexing (SDM), for example.

That is, base station 100 transmits two downlink data portions in one downlink component carrier through SDM. However, allocation of two downlink data portions transmitted in the same downlink component carrier (two downlink data portions forming an SDM pair) is reported by the same downlink allocation control information. That is, one downlink allocation control information portion corresponds to two downlink data portions (two downlink data portions in the same downlink component carrier).

Figure 9A:
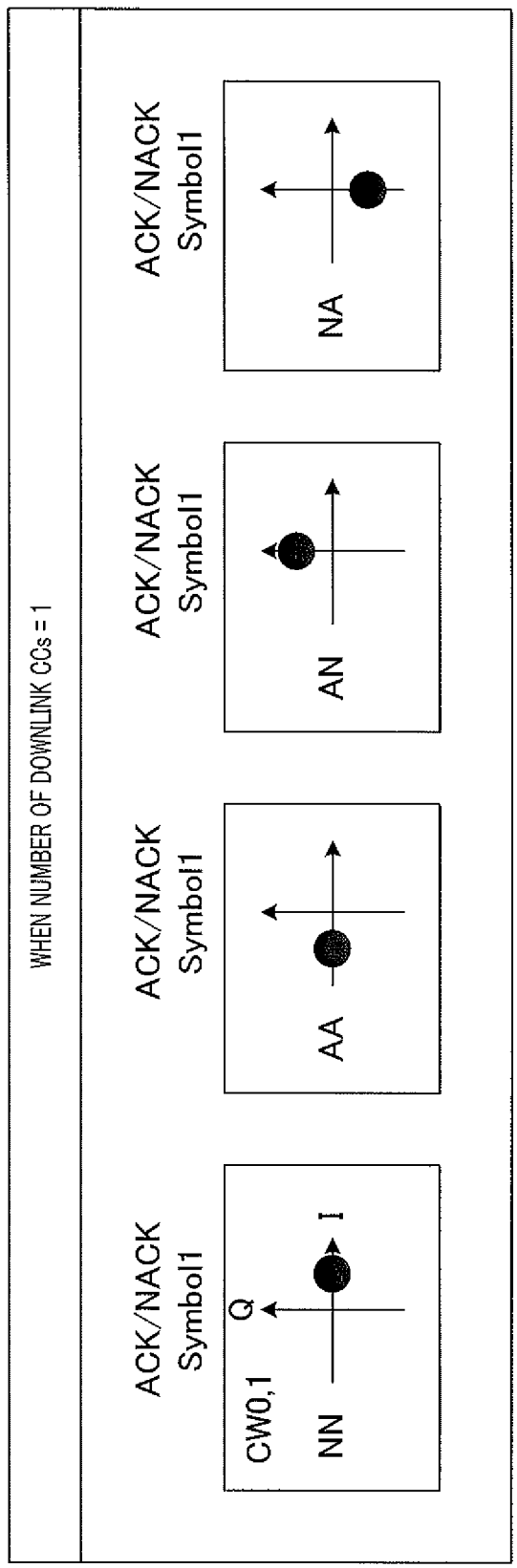
FIG. 9A is a diagram illustrating the correspondence between the number of downlink CCs and phase points of response signals according to the embodiment of the present invention (response signal generation example 3)
Figure 9B:
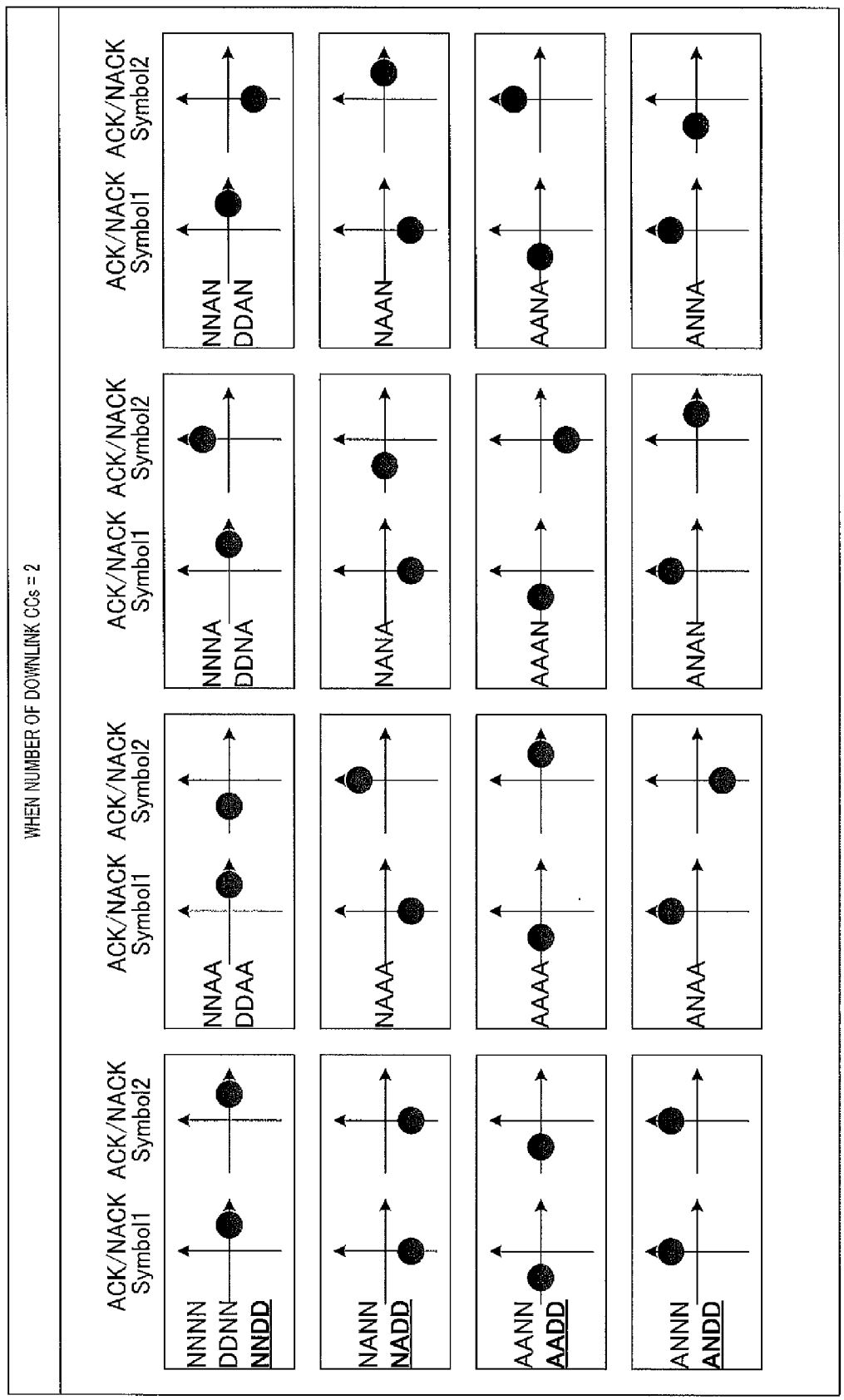
FIG. 9B is a diagram illustrating the correspondence between the number of downlink CCs and phase points of response signals according to the embodiment of the present invention (response signal generation example 3).

FIG. 9A and FIG. 9B are diagrams illustrating response signal generation example 3. As shown in FIG. 9A and FIG. 9B, terminal 200 controls the number of response signals (ACK/NACK symbols) generated and the sequence length of a Walsh code sequence depending on whether the number of downlink CCs configured in terminal 200 is one or two.

[When the Number of Downlink CCs Configured in Terminal 200 is One (FIG. 9A)]

Upon receiving one downlink allocation control information portion in a case where the number of downlink CCs configured in terminal 200 is one, response signal generating section 212 generates one response signal (ACK/NACK symbol 1) as shown in FIG. 9A.

At this time, control section 208 configures one of phase points (−1, 0), (1, 0), (0, j) and (0, −j) in a response signal based on success/failure in receiving two downlink data portions corresponding to the received downlink allocation control information (ACK or NACK). For example, in FIG. 9A, a pattern candidate "NN" for success/failure in receiving downlink data indicates a state in which terminal 200 (receives downlink allocation control information and) fails to decode both of the two downlink data portions transmitted in the same downlink component carrier and "NN" is associated with phase point (1, 0) of ACK/NACK symbol 1. Similarly, in FIG. 9A, a pattern candidate "AN" indicates a state in which terminal 200 (receives downlink allocation control information and) succeeds (ACK) in decoding a first downlink data portion of the two downlink data portions transmitted in the same downlink component carrier, but fails (NACK) to decode a second downlink data portion, and "AN" is associated with phase point (0, j) of ACK/NACK symbol 1. The same applies to pattern candidates "AA" and "NA" shown in FIG. 9A.

Furthermore, as described above, since downlink allocation control information is commonly transmitted for the two downlink data portions that form an SDM pair, when terminal 200 does not receive the downlink allocation control information, the situation of success/failure in receiving downlink data is always "DD" (that is, downlink allocation control information corresponding to both of the first and second downlink data portions is not received).

Furthermore, terminal 200 transmits response signals using PUCCH resources reported beforehand from base station 100 as in the case of response signal generation example 2. To be more specific, control section 208 determines that a Walsh code sequence (e.g., $W_0, W_1, W_2, W_3$ shown in FIG. 1) having a sequence length of 4 corresponding to the PUCCH resources reported beforehand from base station 100 should be used as a spreading code to spread a response signal (ACK/NACK symbol 1).

Thus, when the number of downlink CCs configured in terminal 200 is one (e.g., when performing communication without carrier aggregation), control section 208 instructs response signal generating section 212 to generate one response signal and also configures a Walsh code sequence having a sequence length of 4 corresponding to PUCCH resources for secondary spreading section 215.

[When the Number of Downlink CCs Configured in Terminal 200 is Two (FIG. 9B)]

If even one downlink allocation control information portion is received through a downlink component carrier in a case where the number of downlink CCs configured in terminal 200 is two, response signal generating section 212 generates two response signals (ACK/NACK symbol 1 and ACK/NACK symbol 2) as shown in FIG. 9B. At this time, control section 208 configures one of phase points (−1, 0), (1, 0), (0, j) and (0, −j) in each of two response signals based on success/failure in receiving downlink allocation control information and downlink data (ACK, NACK or DTX).

For example, in FIG. 9B, a pattern candidate "NAAA" of success/failure in receiving downlink allocation control information and downlink data corresponding to the downlink allocation control information indicates a state in which terminal 200 receives downlink allocation control information in both of two downlink component carriers (PCC and SCC), fails (NACK) to decode a first downlink data portion in a first downlink component carrier (e.g., PCC), succeeds (ACK) in decoding a second downlink data portion and succeeds (ACK) in decoding both of the first downlink data portion and the second downlink data portion in a second downlink component carrier (e.g., SCC). Furthermore, in FIG. 9B, "NAAA" is associated with phase point (0, −j) of ACK/NACK symbol 1 and phase point (0, j) of ACK/NACK symbol 2.

Similarly, for example, in FIG. 9B, a pattern candidate "AADD" indicates a state in which terminal 200 receives downlink allocation control information in the first downlink component carrier (e.g., PCC) of the two downlink component carriers configured in terminal 200, succeeds (ACK) in decoding both the first downlink data and the second downlink data, but has not received downlink allocation control information in the second downlink component carrier (e.g., SCC). Furthermore, in FIG. 9B, "AADD" is associated with phase point (−1, 0) of ACK/NACK symbol 1 and phase point (−1, 0) of ACK/NACK symbol 2.

Similarly, other pattern candidates for success/failure in receiving downlink allocation control information and downlink data shown in FIG. 9B are associated with phase points of two response signals. However, as described above, since the two downlink data portions that form an SDM pair are allocated and reported according to the same downlink allocation control information, there is no such situation where only one of the two downlink data portions that form the SDM pair results in DTX.

In this way, control section 208 determines phase points of response signals (ACK/NACK symbol 1 and ACK/NACK symbol 2) using the configuration rule of phase points of response signals shown in FIG. 9B based on the pattern (state) of success/failure in receiving downlink allocation control information and downlink data addressed to terminal 200 (i.e., error detection result).

Furthermore, terminal 200 transmits response signals using a Walsh code sequence corresponding to PUCCH resources reported beforehand from base station 100. For example, control section 208 determines that the first two components (sequence length of 2) of a Walsh code sequence having a sequence length of 4 (e.g., $W_0, W_1, W_2, W_3$ shown in FIG. 1) corresponding to PUCCH resources reported beforehand from base station 100 should be used as spreading codes (e.g., $W_{0,0}, W_{0,1}$ shown in FIG. 3) to spread the first response signal (ACK/NACK symbol 1) and the last two components (sequence length of 2) should be used as spreading codes (e.g., $W_{1,0}, W_{1,1}$ shown in FIG. 3) to spread the second response signal (ACK/NACK symbol 2).

Thus, when the number of downlink CCs configured in terminal 200 is two (e.g., when performing communication using carrier aggregation), control section 208 instructs response signal generating section 212 to generate two response signals. Furthermore, control section 208 extracts the first two components and the last two components from the Walsh code sequence having a sequence length of 4 corresponding to the PUCCH resources reported beforehand from base station 100 and configures two Walsh code sequences having a sequence length of 2 for secondary spreading section 215.

Here, as in the case of response signal generation example 1, the phase point of one response signal (ACK/NACK symbol 1) associated with an arbitrary pattern of success/failure in receiving downlink allocation control information and downlink data in communication without carrier aggregation (FIG. 9A) is configured to be identical to respective phase points of two response signals (ACK/NACK symbol 1 and ACK/NACK symbol 2) associated with a candidate pattern whose pattern of success/failure in reception in PCC in communication using carrier aggregation (FIG. 9B) is identical to the above-described arbitrary pattern in communication without carrier aggregation (FIG. 9A) and which corresponds to a state in which downlink allocation control information is not received through SCC other than PCC (i.e., DTX).

For example, in FIG. 9B, a phase point of a response signal (ACK/NACK symbol 1) associated with "NN" shown in FIG. 9A and respective phase points of two response signals (ACK/NACK symbol 1 and ACK/NACK symbol 2) associated with "NNDD" (i.e., "NN" in PCC and "DD" in SCC) are identical phase point (1, 0). The same applies to "NADD," "AADD" or "ANDD" shown in FIG. 9B and "NA," "AA" or "AN" shown in FIG. 9A as well.

Furthermore, as in the case of response signal generation example 1, in communication using carrier aggregation (FIG. 3), the spreading codes ($W_{0,0}, W_{0,1}$) used to spread ACK/NACK symbol 1 and the spreading codes ($W_{1,0}, W_{1,1}$) used to spread ACK/NACK symbol 2 become partial sequences obtained by dividing the Walsh code sequence ($W_0, W_1, W_2$, W$_3$) used to spread ACK/NACK symbol 1 in communication without carrier aggregation (FIG. 1).

That is, as in the case of response signal generation example 1, the transmission waveform of ACK/NACK symbol 1 corresponding to "NN" (or "NA," "AA," "AN") in communication without carrier aggregation (FIG. 1 and FIG. 9A) is identical to the transmission waveforms of ACK/NACK symbol 1 and ACK/NACK symbol 2 corresponding to "NNDD" (or "NADD," "AADD," "ANDD") in communication using carrier aggregation (FIG. 3 and FIG. 9B).

As in the case of response signal generation example 1, this prevents a "difference in recognition of response signals" from occurring between base station 100 and terminal 200 even for a period during which a "difference in recognition regarding the configuration of the number of downlink CCs" occurs. That is, when SDM is applied to a downlink (when two downlink data portions in one downlink component carrier are transmitted through SDM), uplink response signals are normally transmitted from terminal 200 to base station 100 even for a period during which a difference occurs in recognition regarding the configuration of the number of downlink component carriers configured in terminal 200 between base station 100 and terminal 200.

Response signal generation examples 1 to 3 in terminal 200 have been described so far.

Thus, when the base station changes the configuration of carrier aggregation for the terminal, using higher layer signaling, uplink response signals can be normally transmitted from the terminal to the base station even for a period during which a difference occurs in recognition between the base station and the terminal regarding the configuration of the number of downlink component carriers configured in the terminal.

The embodiment of the present invention has been described so far.

A case has been described in the above embodiment where two ACK/NACK symbols are transmitted in association with one PUCCH resource recognized on the terminal side. However, the terminal side may recognize a plurality of PUCCH resources and further transmit additional information to the base station according to a "resource selection situation" by transmitting two ACK/NACK symbols in association with any one PUCCH resource. That is, the above embodiment can be used concurrently with so-called "channel selection (resource selection)."

Furthermore, a case has been described in the above embodiment where a ZAC sequence is used for primary spreading in PUCCH resources and a set of a Walsh sequence and a DFT sequence is used for secondary spreading as orthogonal code sequences. However, the present invention may also use sequences other than the ZAC sequence, which are mutually separable by different amounts of cyclic shifts for primary spreading. For example, GCL (Generalized Chirp like) sequence, CAZAC (Constant Amplitude Zero Auto Correlation) sequence, ZC (Zadoff-Chu) sequence, PN sequence such as M sequence and orthogonal gold code sequence may be used, or sequences having a steep auto-correlation characteristic on the time axis randomly generated by a computer may be used for primary spreading. Furthermore, any sequences that are mutually orthogonal sequences or can be substantially regarded as mutually orthogonal sequences may be used for secondary spreading. In the above descriptions, resources of response signals (e.g., PUCCH resources) are defined by the amount of cyclic shift of a ZAC sequence and the sequence number of an orthogonal code sequence.

Furthermore, in the above embodiment, control section 101 of base station 100 performs control so that downlink data and downlink allocation control information for the downlink data are mapped to identical downlink component carriers, but the present invention is not limited to this configuration. That is, the techniques described in the embodiment are applicable even when downlink data and downlink allocation control information corresponding to the downlink data are mapped to different downlink component carriers, as long as the correspondence between downlink allocation control information and downlink data is clear.

A case has been described in the present embodiment where IFFT transform is performed after primary spreading and secondary spreading as the order of processing on the terminal side. However, the order of processing is not limited to this configuration. Equivalent results can be obtained irrespective of the location of secondary spreading processing as long as IFFT processing is located after primary spreading processing.

Furthermore, although an antenna has been described in the aforementioned embodiment, the present invention may be similarly applied to an antenna port.

The antenna port refers to a logical antenna including a single or a plurality of physical antenna(s). That is, the antenna port is not limited to a single physical antenna, but may refer to an antenna array including a plurality of antennas.

For example, in 3 GPP LTE, how many physical antennas are included in the antenna port is not specified, but the minimum unit allowing the base station to transmit different reference signals is specified.

In addition, the antenna port may be specified as a minimum unit for multiplying a weight of the precoding vector.

Also, although the present invention has been described with an example employing a hardware configuration in the above embodiment, the present invention can also be realized by software in cooperation with hardware.

Each function block employed in the description of the aforementioned embodiment may typically be implemented as an LSI, which is an integrated circuit. These functional blocks may be formed as individual chips or partially or totally contained on a single chip. The term "LSI" is used herein but this may also be referred to as "IC," "system LSI," "super LSI," or "ultra LSI" depending on differing extents of integration.

Furthermore, the method of circuit integration is not limited to LSI's, and implementation using dedicated circuitry or general purpose processors is also possible. It is also possible to use, after LSI manufacture, a programmable FPGA (Field Programmable Gate Array) or a reconfigurable processor where connections and settings of circuit cells within an LSI can be reconfigured.

Furthermore, if integrated circuit technology emerges and replaces LSI's as a result of the advancement of semiconductor technology or a derivative of another technology, this technology can be used for integration of the functional blocks as a matter of course. Application of biotechnology is also possible.

The disclosure of Japanese Patent Application No. 2010-115468, filed on May 19, 2010, including the specification, drawings and abstract is incorporated herein by reference in its entirety.

INDUSTRIAL APPLICABILITY

The present invention is applicable to a mobile communication system or the like.

REFERENCE SIGNS LIST 100 base station
101, 208 control section 102 control information generating section
103, 105 coding section
104, 107, 213 modulation section
106 data transmission control section
108 mapping section
109, 216 IFFT section
110, 217 CP adding section
111, 218 radio transmitting section
112, 201 radio receiving section
113, 202 CP removing section
114 PUCCH extraction section
115 despreading section
116 sequence control section
117 correlation processing section
118, 207 decision section
119 retransmission control signal generating section
200 terminal
203 FFT section
204 extraction section
205, 209 demodulation section
206, 210 decoding section
211 CRC section
212 response signal generating section
214 primary spreading section
215 secondary spreading section

The invention claimed is:

1. A terminal apparatus, comprising:
a receiving section that receives allocation control information transmitted through a control channel of at least one of a plurality of component carriers, and data transmitted through a data channel in first communication with a base station apparatus using the plurality of component carriers including a primary component carrier, or second communication with the base station apparatus using only the primary component carrier;
a generating section that generates, in the second communication, one response signal indicating success or failure in receiving the data through the primary component carrier, and generates, in the first communication, two response signals indicating success or failure in receiving the allocation control information and the data of the plurality of component carriers; and
a sequence multiplication section that multiplies, in the second communication, the one response signal by a first sequence and multiplies, in the first communication, the two response signals by a second sequence and a third sequence, respectively, the second and third sequences being obtained by dividing the first sequence, wherein:
success or failure in receiving the allocation control information and the data is indicated by phase points of the response signals, and a phase point of the one response signal indicating the success or failure in reception for the primary component carrier in the second communication is identical to respective phase points of the two response signals indicating the success or failure in reception for the primary component carrier identical to the success or failure in reception for the primary component carrier in the second communication and the success or failure in reception which is a state in which the allocation control information is not received through component carriers other than the primary component carrier.

2. The terminal apparatus according to claim 1, wherein a pair of phase points of the two response signals indicating the success or failure in reception for M (provided that, M is a natural number equal to 2 or above) component carriers in the first communication using the M component carriers is identical to a pair of phase points of the two response signals indicating the success or failure in reception for the component carriers indicating the success or failure in reception for the component carriers identical to the M component carriers in the first communication using N (provided that, N is a natural number greater than M) component carriers, which is identical to the success or failure in reception for the M component carriers in the first communication using the M component carriers and the success or failure in reception which corresponds to a state in which the allocation control information is not received through all (N-M) component carriers other than the M component carriers.

3. A response signal transmission method comprising:
receiving allocation control information transmitted through a control channel of at least one of a plurality of component carriers and data transmitted through a data channel in first communication with a base station apparatus using the plurality of component carriers including a primary component carrier, or second communication with the base station apparatus using only the primary component carrier;
generating, in the second communication, one response signal indicating success or failure in receiving the data of the primary component carrier, and generating, in the first communication, two response signals indicating success or failure in receiving the allocation control information and the data of the plurality of component carriers;
multiplying, in the second communication, the one response signal by a first sequence, and multiplying, in the first communication, the two response signals by a second sequence and a third sequence, respectively, the second sequence and third sequence being obtained by dividing the first sequence, wherein:
success or failure in receiving the allocation control information and the data is indicated by phase points of the response signals, and a phase point of the one response signal indicating the success or failure in reception for the primary component carrier in the second communication is identical to respective phase points of the two response signals indicating the success or failure in reception for the primary component carrier identical to the success or failure in reception for the primary component carrier in the second communication and the success or failure in reception which corresponds to a state in which the allocation control information is not received through component carriers other than the primary component carrier.

* * * * *